(12) United States Patent
Goto

(10) Patent No.: US 11,391,400 B2
(45) Date of Patent: Jul. 19, 2022

(54) THREADED CONNECTION FOR PIPES OR TUBES AND METHOD FOR PRODUCING THE THREADED CONNECTION FOR PIPES OR TUBES

(71) Applicants: Nippon Steel Corporation, Tokyo (JP); Vallourec Oil and Gas France, Aulnoye-Aymeries (FR)

(72) Inventor: Kunio Goto, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 335 days.

(21) Appl. No.: 16/613,899

(22) PCT Filed: May 10, 2018

(86) PCT No.: PCT/JP2018/018221
§ 371 (c)(1),
(2) Date: Nov. 15, 2019

(87) PCT Pub. No.: WO2018/216497
PCT Pub. Date: Nov. 29, 2018

(65) Prior Publication Data
US 2021/0364119 A1    Nov. 25, 2021

(30) Foreign Application Priority Data

May 22, 2017   (JP) .............................. JP2017-100607

(51) Int. Cl.
*F16L 9/14*       (2006.01)
*F16L 15/08*      (2006.01)
(Continued)

(52) U.S. Cl.
CPC ........... *F16L 15/08* (2013.01); *C10M 145/18* (2013.01); *C10M 147/02* (2013.01);
(Continued)

(58) Field of Classification Search
CPC ....... F16L 58/08; F16L 15/08; F16L 58/1054; F16L 58/182; C25D 5/12
(Continued)

(56) References Cited

U.S. PATENT DOCUMENTS 3,314,450 A * 4/1967 Doering .............. C03C 17/3405
                                                   138/146
4,146,060 A * 3/1979 Garrett .................... B23P 11/00
                                                   138/143
(Continued)

FOREIGN PATENT DOCUMENTS

JP       S58-17285 A       2/1983
JP     2002-221288 A       8/2002
(Continued)

OTHER PUBLICATIONS

Jul. 24, 2018 (WO) International Search Report Application No. PCT/JP2018/018221.
(Continued)

*Primary Examiner* — James F Hook
(74) *Attorney, Agent, or Firm* — Banner & Witcoff, Ltd.

(57) ABSTRACT

This invention provides a threaded connection for pipes or tubes having excellent misalignment resistance and high torque on shoulder resistance, and also having excellent corrosion resistance properties, as well as a method for producing the threaded connection for pipes or tubes. The threaded connection for pipes or tubes includes a pin and a box. The pin and the box include contact surfaces having threaded portions and unthreaded metal contact portions. The threaded connection for pipes or tubes includes, on at least one of the contact surfaces of the pin and the box, surface roughness, a Zn—Ni alloy plating layer, a Cu—Sn—Zn alloy plating layer and a solid lubricant coating layer. These are deposited from the contact surface side in the order of: surface roughness, the Zn—Ni alloy plating layer, (Continued)

the Cu—Sn—Zn alloy plating layer and the solid lubricant coating layer.

17 Claims, 6 Drawing Sheets

(51) Int. Cl.
    *C25D 5/12*     (2006.01)
    *C10M 145/18*     (2006.01)
    *C10M 147/02*     (2006.01)
    *C10M 147/04*     (2006.01)
    *C10M 149/18*     (2006.01)
    *F16L 58/08*     (2006.01)
    *F16L 58/10*     (2006.01)
    *F16L 58/18*     (2006.01)

(52) U.S. Cl.
    CPC ........ *C10M 147/04* (2013.01); *C10M 149/18* (2013.01); *C25D 5/12* (2013.01); *F16L 58/08* (2013.01); *F16L 58/1054* (2013.01); *F16L 58/182* (2013.01)

(58) Field of Classification Search
    USPC .................................................. 138/39, 146
    See application file for complete search history.

(56) References Cited

U.S. PATENT DOCUMENTS

| | | | | |
|---|---|---|---|---|
| 5,853,834 A | * | 12/1998 | Siegmund | F16L 58/1009 428/36.9 |
| 2004/0113423 A1 | * | 6/2004 | Dell'Erba | E21B 17/042 285/55 |
| 2008/0004387 A1 | | 1/2008 | Weiss et al. | |
| 2008/0257461 A1 | * | 10/2008 | Son | C22C 38/06 148/651 |
| 2009/0038704 A1 | * | 2/2009 | Sausner | C23C 2/26 138/143 |
| 2010/0301600 A1 | * | 12/2010 | Goto | C10M 129/70 285/333 |
| 2013/0075083 A1 | * | 3/2013 | Gard | F16L 58/182 166/242.6 |
| 2015/0192229 A1 | * | 7/2015 | Goto | F16L 15/00 285/94 |
| 2015/0210888 A1 | | 7/2015 | Goto | |
| 2015/0323108 A1 | * | 11/2015 | Mueller | F16L 21/002 285/39 |
| 2016/0208562 A1 | * | 7/2016 | Millet | C23C 18/36 |

FOREIGN PATENT DOCUMENTS

| | | |
|---|---|---|
| JP | 200813560 A | 1/2008 |
| JP | 2008-069883 A | 3/2008 |
| JP | 2008-215473 A | 9/2008 |
| JP | 2013-087829 A | 5/2013 |
| JP | 2015-506445 A | 3/2015 |
| WO | 2014042144 A1 | 3/2014 |
| WO | 2017/047722 A1 | 3/2017 |

OTHER PUBLICATIONS

English Abstract of JP2002221288A.
English Abstract of JP-2008-215473.

* cited by examiner

THREADED CONNECTION FOR PIPES OR TUBES AND METHOD FOR PRODUCING THE THREADED CONNECTION FOR PIPES OR TUBES

TECHNICAL FIELD

The present invention relates to a threaded connection for pipes or tubes and a method for producing the threaded connection for pipes or tubes, and more particularly to a threaded connection for oil country tubular goods and a method for producing the threaded connection for oil country tubular goods.

BACKGROUND ART

Oil well pipes are used for drilling of oil fields and natural gas fields. Oil well pipes are formed by coupling a plurality of steel pipes in accordance with the depth of the well. Connection of steel pipes can be carried out by fastening threaded connection for pipes or tubes formed at ends of the two steel pipes. Oil well pipes are lifted and loosened for inspection and the like, and then refastened after being inspected, and reused.

Threaded connection for pipes or tubes include a pin and a box. The pin includes a male threaded portion and an unthreaded metal contact portion formed in the outer peripheral surface at the end of the pipe. The box includes a female threaded portion and an unthreaded metal contact portion formed in the inner peripheral surface at the end of the pipe. The threaded portions and unthreaded metal contact portions of the pin and the box repeatedly experience strong friction during fastening and loosening of the threaded connection. If these portions are not sufficiently resistant to friction, galling (unrepairable seizure) will occur during repeated fastening and loosening. Thus, it is necessary that threaded connection for pipes or tubes have sufficient resistance to friction, i.e., excellent galling resistance.

Heretofore, heavy metal-containing compound greases, referred to as dopes, have been used to improve the galling resistance. Application of a compound grease to the surface of a threaded connection for pipes or tubes can improve the galling resistance of the threaded connection for pipes or tubes. However, heavy metals contained in compound greases, such as Pb, Zn, and Cu, may affect the environment. For this reason, practical application of a compound grease-free threaded connection for pipes or tubes is desired.

Japanese Patent Application Publication No. 2002-221288 (Patent Literature 1) and Japanese Patent Application Publication No. 2008-215473 (Patent Literature 2) propose a threaded connection for pipes or tubes that does not include a compound grease but has excellent galling resistance.

On a contact surface of a pin or a box of a threaded connection for pipes or tubes described in Patent Literature 1, a porous Zn or Zn alloy layer is formed by an impact plating method on at least one of a threaded portion or an unthreaded metal contact portion of the threaded connection for pipes or tubes, and a solid lubricant coating layer or a liquid lubricant coating that does not contain heavy metal powder (for example, a coating having an overbased organic metal salt such as overbased sulfonate as a main component) is formed thereon. Patent Literature 1 describes that, by this means, a threaded connection for pipes or tubes having high anticorrosive properties is provided that, without using a liquid lubricant containing heavy metal powder such as compound grease, can suppress the occurrence of galling as well as a decline in gas tightness caused by rust occurrence when tightening and loosening are repeatedly performed.

A threaded connection for pipes or tubes described in Patent Literature 2 is characterized by having a first plating layer composed on a Cu—Zn alloy on at least one of the contact surfaces of a pin and a box. Patent Literature 2 describes that, as a result, a threaded connection has excellent leakage resistance and galling resistance, and furthermore, crevice corrosion in a case where a lubricant coating is formed on the plating layer is improved.

To suppress galling of a threaded connection for pipes or tubes, it is effective to form a plating layer containing a metal with high hardness and a high fusing point. Therefore, conventionally, copper (Cu) plating or Cu alloy plating has been used. The hardness and fusing point of Cu are high. Therefore, by containing Cu in the plating layer, the hardness and fusing point of the overall plating layer increase. Accordingly, the galling resistance of the threaded connection for pipes or tubes increases.

CITATION LIST

Patent Literature

Patent Literature 1: Japanese Patent Application Publication No. 2002-221288
Patent Literature 2: Japanese Patent Application Publication No. 2008-215473

SUMMARY OF INVENTION

Technical Problem

In this connection, evaluation of galling resistance is normally performed in a state in which the centers of the steel pipes to be fastened are aligned with each other. However, when actually fastening a threaded connection for pipes or tubes, the centers of the steel pipes (or a steel pipe and a coupling) to be fastened together may be out of alignment with each other. Such a situation is referred to as a "misalignment". When a misalignment occurs, the threaded portions and unthreaded metal contact portions of the pin and box are subjected to a strong shearing stress in addition to strong friction. The shearing stress at such time is noticeably large in comparison to a case where there is no misalignment. Consequently, galling is more likely to occur when a misalignment occurs. Accordingly, it is necessary that a threaded connection for pipes or tubes has performance that inhibits galling even in a case where a misalignment occurs, in other words, misalignment resistance.

On the other hand, the aforementioned unthreaded metal contact portions include metal seal portions and shoulder portions. During fastening of a threaded connection for pipes or tubes, the shoulder portions of the pin and box come in contact with each other. Torque that arises at that time is called "shouldering torque". During fastening of a threaded connection for pipes or tubes, after the shouldering torque is reached, fastening is continued until fastening is completed. By this means, the gas tightness of the threaded connection for pipes or tubes is enhanced. If fastening proceeds further, metal constituting at least one of the pin and the box starts to undergo a plastic deformation. The torque at such time is referred to as "yield torque".

The torque when fastening is completed (hereunder, referred to as "fastening torque") is set so that a sufficient seal interfacial pressure is obtained irrespective of the size of the thread interference amount. If there is a sufficient difference between the shouldering torque and the yield torque (hereunder, this difference is referred to as "torque on shoulder resistance $\Delta T^{[m]}$"), the range of the fastening torque widens. As a result, the fastening torque is adjusted easily. Therefore, it is necessary that, in addition to the aforementioned misalignment resistance, a threaded connection for pipes or tubes also has a high torque on shoulder resistance $\Delta T\square$ On the other hand, oil country tubular goods, after production, are transported by ship or by other means and stored for a certain period of time before being used. In some cases, the transport and storage of oil country tubular goods extend for a long time. Furthermore, in some cases, oil country tubular goods are stored in an outdoor location. When oil country tubular goods are stored in an outdoor location for a long period of time, the threaded connections for pipes or tubes may be subjected to corrosion, which can result in decreased galling resistance and gas tightness of the threaded connections for pipes or tubes. Therefore, it is necessary that threaded connections for pipes or tubes have not only the aforementioned misalignment resistance and high torque on shoulder resistance $\Delta T\square$ but also excellent corrosion resistance properties.

In the threaded connection for pipes or tubes disclosed in Patent Literature 1, the Zn or Zn alloy layer is porous. Therefore, the adhesion properties with respect to the solid lubricant coating layer are good, and the threaded connection for pipes or tubes has sufficient galling resistance. However, because the Zn or Zn alloy layer is porous, an air gap arises between the Zn or Zn alloy layer and the base material. Consequently, in some cases the base material at the air gap portion that arises corrodes over the course of a long period.

In Patent Literature 2, although the galling resistance of the disclosed threaded connection for pipes or tubes is investigated therein, the misalignment resistance of the threaded connection for pipes or tubes is not investigated therein. Therefore, even if the galling resistance is sufficient in a case where misalignment does not arise, the misalignment resistance may be low. In addition, in some cases the torque on shoulder resistance $\Delta T\square$ decreases, and the adhesion properties of the solid lubricant coating layer are low and the corrosion resistance properties are low.

An objective of the present invention is to provide a threaded connection for pipes or tubes having excellent misalignment resistance and high torque on shoulder resistance $\Delta T\square$ and also having excellent corrosion resistance properties, as well as a method for producing the threaded connection for pipes or tubes.

Solution to Problem

The threaded connection for pipes or tubes according to the present embodiment includes a pin and a box. The pin and the box each include a contact surface that includes a threaded portion and an unthreaded metal contact portion. At least one of the contact surfaces of the pin and the box has a surface roughness having an arithmetic mean roughness Ra of 1 to 8 µm and a maximum height roughness Rz of 10 to 40 µm. The threaded connection for pipes or tubes includes, on a contact surface having the aforementioned surface roughness, a Zn—Ni alloy plating layer consisting of a Zn—Ni alloy, a Cu—Sn—Zn alloy plating layer consisting of a Cu—Sn—Zn alloy, and a solid lubricant coating layer. These layers are deposited in the order of the Zn—Ni alloy plating layer, the Cu—Sn—Zn alloy plating layer and the solid lubricant coating layer from the contact surface side. The solid lubricant coating layer contains fluororesin particles and at least one type of resin selected from the group consisting of epoxy resin and polyamide-imide resin.

In this case, the arithmetic mean roughness Ra and the maximum height roughness Rz are measured based on JIS B 0601 (2013).

The method for producing a threaded connection for pipes or tubes of the present embodiment is a method for producing a threaded connection for pipes or tubes that includes a pin and a box. The pin and the box each include a contact surface having a threaded portion and an unthreaded metal contact portion. The production method of the present embodiment includes a surface roughness formation step, a Zn—Ni alloy plating layer formation step, a Cu—Sn—Zn alloy plating layer formation step and a solid lubricant coating layer formation step. In the surface roughness formation step, a surface roughness having an arithmetic mean roughness Ra of 1 to 8 µm and a maximum height roughness Rz of 10 to 40 µm is formed on at least one of the contact surfaces of the pin and the box by a blasting process. In the Zn—Ni alloy plating layer formation step, a Zn—Ni alloy plating layer consisting of a Zn—Ni alloy is formed by electroplating on the contact surface on which the aforementioned surface roughness was formed. In the Cu—Sn—Zn alloy plating layer formation step, a Cu—Sn—Zn alloy plating layer consisting of a Cu—Sn—Zn alloy is formed by electroplating after the Zn—Ni alloy plating layer is formed. In the solid lubricant coating layer formation step, a solid lubricant coating layer is formed after the Cu—Sn—Zn alloy plating layer is formed.

Advantageous Effects of Invention

The threaded connection for pipes or tubes of the present embodiment is excellent in misalignment resistance, has a high torque on shoulder resistance $\Delta T$ and has excellent corrosion resistance properties.

DESCRIPTION OF EMBODIMENTS

The present embodiment will be described in detail below with reference to the drawings. The same reference symbols will be used throughout the drawings to refer to the same or like parts, and description thereof will not be repeated.

The present inventor conducted various studies regarding the relation between a threaded connection for pipes or tubes, misalignment resistance, the torque on shoulder resistance $\Delta T_S$ and corrosion resistance properties. As a result, the present inventor obtained the following findings.

[Misalignment Resistance]

Figure 1:
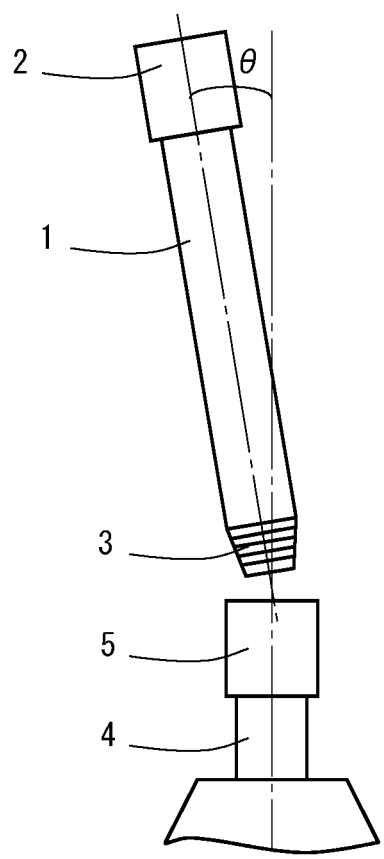
FIG. 1 is a schematic diagram illustrating fastening of a threaded connection for pipes or tubes in a case where a misalignment has arisen.

In a conventional threaded connection for pipes or tubes, even if the galling resistance is adequate in a case where a misalignment does not arise, in some cases the misalignment resistance is inadequate. The term "misalignment" refers to a situation that is illustrated in FIG. 1. Referring to FIG. 1, a coupling 2 is attached to a tip end of a steel pipe 1. A pin 3 is formed at the other tip end of the steel pipe 1. A coupling 5 is attached to a tip end of a different steel pipe 4. A box is formed on the inner peripheral surface of the coupling 5. The pin 3 of the steel pipe 1 is inserted into the coupling 5 and fastened. By this means, the steel pipe 1 is connected to the steel pipe 4. When fastening is performed, in some cases the central axis in the longitudinal direction of the steel pipe 1 and the central axis in the longitudinal direction of the steel pipe 4 are out of alignment and intersect with each other. Such a situation is referred to as "misalignment". In FIG. 1, a misalignment in which the toe angle is 0° is illustrated. If fastening is performed in a state in which a misalignment has occurred, galling is more likely to occur in comparison to a situation in which there is no misalignment.

The Zn—Ni alloy plating layer, the Cu—Sn—Zn alloy plating layer and the solid lubricant coating layer are generically referred to as simply "coating". In order to increase the misalignment resistance of the threaded connection for pipes or tubes, the adhesion properties of the coating are enhanced. Surface roughness having an arithmetic mean roughness Ra of 1 to 8 µm and a maximum height roughness Rz of 10 to 40 µm (hereinafter, also referred to as "specific surface roughness") is formed on the threaded portion and unthreaded metal contact portion (hereinafter, referred to as "contact surface") of at least one of the pin and the box. If the coating is formed on the contact surface that has the specific surface roughness, the adhesion properties are improved by a so-called "anchor effect". When the adhesion properties of the coating are improved, delamination of the coating is suppressed, even in a case where the threaded connection for pipes or tubes is repeatedly exposed to a high temperature and a low temperature. If delamination of the coating is suppressed, high lubricity is maintained during fastening and loosening. Therefore, the misalignment resistance of the threaded connection for pipes or tubes increases.

In order to increase the misalignment resistance of the threaded connection for pipes or tubes, a plating layer having high hardness and a high fusing point is additionally formed on the contact surface. If the hardness of the plating layer is high, the plating layer is not liable to be damaged easily when fastening and loosening the threaded connection for pipes or tubes. In addition, if the fusing point of the plating layer is high, when fastening and loosening the threaded connection for pipes or tubes, it is difficult for elution of the plating layer to occur even in a case where a high temperature arises locally in the plating layer. A Cu—Sn—Zn alloy has high hardness and a high fusing point. Therefore, the present embodiment includes a Cu—Sn—Zn alloy plating layer consisting of a Cu—Sn—Zn alloy. Consequently, the misalignment resistance of the threaded connection for pipes or tubes increases further.

[Torque on Shoulder Resistance $\Delta T_S$]

Figure 2:
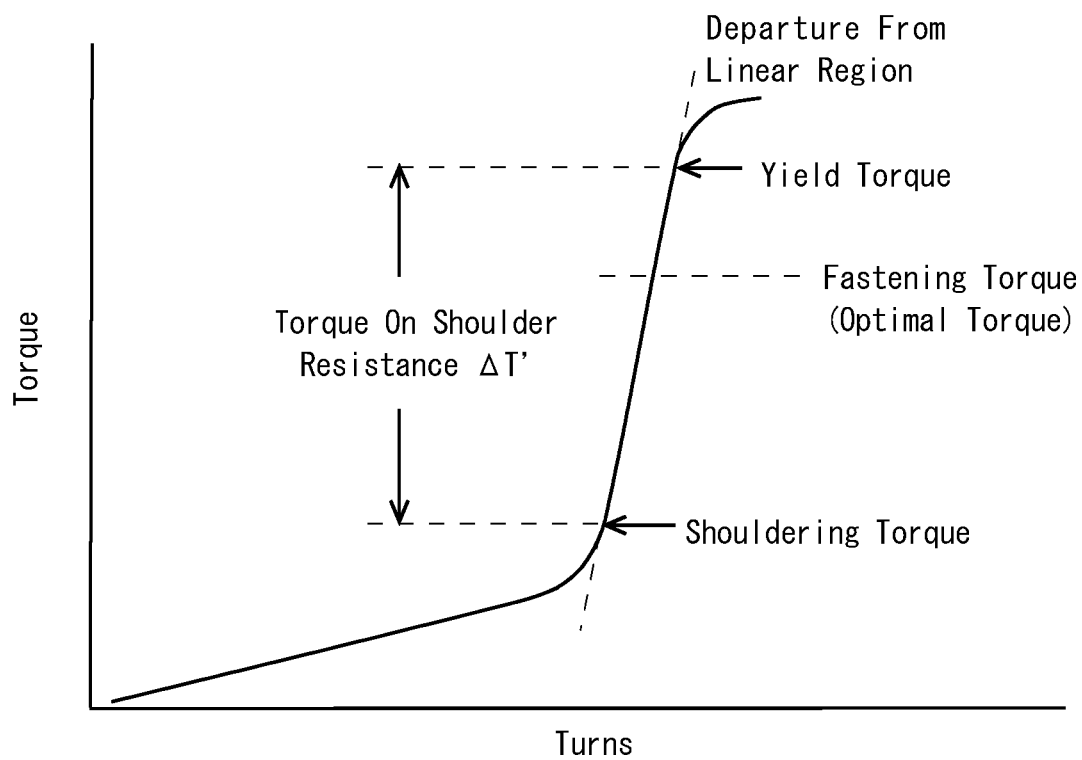
FIG. 2 is a graph illustrating the relation between the number of turns of a threaded connection for pipes or tubes and the torque.

During fastening of steel pipes to each other, the optimal torque to end the fastening is determined in advance. FIG. 2 is a graph illustrating the relation between the number of turns of steel pipes and the torque during fastening of threaded connections for pipes or tubes that have a shoulder portion. Referring to FIG. 2, fastening of the threaded connections for pipes or tubes initially increases the torque in proportion to the number of turns. The rate of increase in the torque at such time is low. As fastening continues, the shoulder portions come in contact with each other. The torque at such time is referred to as "shouldering torque". After the shouldering torque is reached, when fastening is continued, the torque again increases in proportion to the number of turns. The rate of increase in the torque at such time is high. The fastening is completed at a time point at which the torque reaches a predetermined numerical value (fastening torque). If the torque during fastening reaches the fastening torque, the metal seal portions interfere with each other with an appropriate interfacial pressure. In this case, the gas tightness of the threaded connections for pipes or tubes increases.

If fastening is further continued after the fastening torque is reached, the torque becomes too high. If the torque becomes too high, a part of the pin and the box undergoes a plastic deformation. The torque at such time is referred to as "yield torque". When the torque on shoulder resistance $\Delta T_S$ which is the difference between the shouldering torque and the yield torque is large, a margin can be provided with respect to the range of the fastening torque. As a result, it is easy to adjust the fastening torque. Therefore, a higher value for the torque on shoulder resistance $\Delta T_S$ is preferable.

In order to raise the torque on shoulder resistance $\Delta T_S$ it is effective to lower the shouldering torque or to increase the yield torque. In the present embodiment, the frictional resistance is reduced in order to reduce the shouldering torque.

In the present embodiment, the lubricity of the solid lubricant coating layer is increased in order to reduce the frictional resistance. If the solid lubricant coating layer contains fluororesin particles and at least one type of resin selected from the group consisting of epoxy resin and polyamide-imide resin, the lubricity increases. In this case, the shouldering torque can be maintained at a low amount.

[Corrosion Resistance Properties]

If a Zn—Ni alloy is used, the corrosion resistance properties of the threaded connection for pipes or tubes can be improved. Zinc (Zn) is a base metal in comparison to iron (Fe), nickel (Ni) and chromium (Cr). Therefore, by forming a plating layer containing zinc (Zn) on the contact surface, the plating layer is corroded with priority relative to the steel material (sacrificial protection). By this means, the threaded connection for pipes or tubes exhibits improved corrosion resistance properties.

[Order of Depositing Each Layer]

In the present embodiment, the order of depositing the Zn—Ni alloy plating layer, the Cu—Sn—Zn alloy plating layer and the solid lubricant coating layer is important. In particular, the order of depositing the Zn—Ni alloy plating layer and the Cu—Sn—Zn alloy plating layer is important. Table 1 shown hereunder was obtained by extracting some of the data obtained in examples that are described later.

TABLE 1

| Test No. | | Zn—Ni Alloy Plating Layer (micro-Vickers hardness, thickness) | Cu—Sn—Zn Alloy Plating Layer (micro-Vickers hardness, thickness) | Fastening Performance | | | Corrosion Resistance |
|---|---|---|---|---|---|---|---|
| | | | | Galling Resistance | | Torque On | |
| | | | | Hand-tightening (times) | Misalignment Resistance (times) | Shoulder Resistance $\Delta T\square$ | Properties Salt Spray Test |
| 1 | Pin surface | Zn—Ni Alloy Plating Layer (450, 8 μm) | — | 20< | 20< | 125 | — |
| | Box surface | Zn—Ni Alloy Plating Layer (450, 8 μm) | Cu—Sn—Zn Alloy Plating Layer (650, 10 μm) | | | | Box Rust-free after 4000 Hours |
| 8 | Pin surface | Zn—Ni Alloy Plating Layer (450, 8 μm) | — | 5 | 5 | 118 | — |
| | Box surface | Cu—Sn—Zn Alloy Plating Layer (650, 10 μm) | Zn—Ni Alloy Plating Layer (450, 8 μm) | | | | Box Rust found after 750 Hours |

In Table 1, the composition of a coating of a threaded connection for pipes or tubes of Test No. 1 and Test No. 8 of the examples that are described later as well as the evaluation results are shown. In Table 1, the term "pin surface" refers to a contact surface of a pin. The term "box surface" refers to a contact surface of a box.

In Test No. 1 and Test No. 8, all the conditions were the same except for the order of depositing the plating layers on the box surface. In Test No. 1 and Test No. 8, the surface roughness before plating was the same. Specifically, the arithmetic mean roughness Ra of the pin surface was 0.3 μm, and the maximum height roughness Rz of the pin surface was 5.8 μm. The arithmetic mean roughness Ra of the box surface was 2.0 μm, and the maximum height roughness Rz of the box surface was 24.0 μm. In both Test No. 1 and Test No. 8, a chromate coating was formed on the Zn—Ni alloy plating layer on the pin surface. In both Test No. 1 and Test No. 8, a solid lubricant coating layer containing 10% polytetrafluoroethylene particles and epoxy resin was formed on the outermost layer of the box surface.

Referring to Table 1, the threaded connection for pipes or tubes of Test No. 8 included a Zn—Ni alloy plating layer, a Cu—Sn—Zn alloy plating layer and a solid lubricant coating layer. The threaded connection for pipes or tubes of Test No. 8 included the Zn—Ni alloy plating layer on the Cu—Sn—Zn alloy plating layer. The galling resistance of the threaded connection for pipes or tubes of Test No. 8 was 5 times in the galling resistance evaluation with hand tightening, and was 5 times in the evaluation of the misalignment resistance evaluation test. In addition, rust occurred on the box of the threaded connection for pipes or tubes of Test No. 8 after 750 hours in a salt spray test. On the other hand, the galling resistance of the threaded connection for pipes or tubes of Test No. 1 in which a Cu—Sn—Zn alloy plating layer was formed on a Zn—Ni alloy plating layer, was more than 20 times in the galling resistance evaluation with hand tightening, and was more than 20 times in the evaluation of the misalignment resistance evaluation test. In addition, rust did not occur on the box of the threaded connection for pipes or tubes of Test No. 1 for 4000 hours of salt spraying.

Compared with Test No. 1 and Test No. 8, it is found even when a Zn—Ni alloy plating layer is disposed on a Cu—Sn—Zn alloy plating layer, the misalignment resistance, the torque on shoulder resistance $\Delta T\square$ and the corrosion resistance properties of the threaded connection for pipes or tubes cannot all be improved. Only when a Cu—Sn—Zn alloy plating layer is disposed on a Zn—Ni alloy plating layer can the misalignment resistance, the torque on shoulder resistance $\Delta T\square$ and the corrosion resistance properties of the threaded connection for pipes or tubes all be improved.

It is considered that the reason that the order of depositing the alloy plating layers significantly influences the performance of the threaded connection for pipes or tubes is as follows. The Zn—Ni alloy plating layer improves the corrosion resistance properties of the threaded connection for pipes or tubes by sacrificial protection. If the Zn—Ni alloy plating layer is away from the base material of the threaded connection for pipes or tubes, the sacrificial protection effect decreases. Therefore, the corrosion resistance properties of the threaded connection for pipes or tubes decrease. The Cu—Sn—Zn alloy plating layer has high hardness and a high fusing point. Therefore, even in a case where there is a misalignment, the Cu—Sn—Zn alloy plating layer protects the Zn—Ni alloy plating layer that is below the Cu—Sn—Zn alloy plating layer from damage. This effect is not obtained when the Cu—Sn—Zn alloy plating layer is below the Zn—Ni alloy plating layer. Therefore, on the contact surface, it is important to deposit the Zn—Ni alloy plating layer and the Cu—Sn—Zn alloy plating layer in that order from the contact surface side.

Based on the foregoing, it is found that only when alloy plating layers having specific compositions are deposited in a specific order can the misalignment resistance, the torque on shoulder resistance $\Delta T\square$ and the corrosion resistance properties of the threaded connection for pipes or tubes all be improved.

The threaded connection for pipes or tubes of the present embodiment that was completed based on the above findings includes a pin and a box. The pin and the box each include a contact surface having a threaded portion and an unthreaded metal contact portion. At least one of the contact surfaces of the pin and box has a surface roughness having an arithmetic mean roughness Ra of 1 to 8 μm and a maximum height roughness Rz of 10 to 40 μm. The threaded connection for pipes or tubes includes, on a contact surface having the aforementioned surface roughness, a Zn—Ni alloy plating layer consisting of a Zn—Ni alloy, a Cu—Sn—Zn alloy plating layer consisting of a Cu—Sn—Zn alloy, and a solid lubricant coating layer. These layers are deposited in the order of the Zn—Ni alloy plating layer, the Cu—Sn—Zn alloy plating layer and the solid lubricant coating layer from the contact surface side. The solid lubricant coating layer contains fluororesin particles and at least one type of resin selected from the group consisting of epoxy resin and polyamide-imide resin.

The threaded connection for pipes or tubes of the present embodiment is excellent in misalignment resistance, has a high torque on shoulder resistance ΔT and has excellent corrosion resistance properties.

Preferably, the hardness of the Zn—Ni alloy plating layer is a micro-Vickers hardness of 300 or more, and the thickness of the Zn—Ni alloy plating layer is in a range of 5 to 20 μm.

In this case, the corrosion resistance properties are further improved.

Preferably, the hardness of the Cu—Sn—Zn alloy plating layer is a micro-Vickers hardness of 500 or more, and the thickness of the Cu—Sn—Zn alloy plating layer is in a range of 5 to 20 μm.

In this case, the misalignment resistance is further improved.

Preferably, the hardness of the solid lubricant coating layer is a micro-Vickers hardness in a range of 15 to 25, and the thickness of the solid lubricant coating layer is in a range of 10 to 40 μm.

In this case, the torque on shoulder resistance ΔT□ is more stably improved.

Preferably, the fluororesin particles are one or more types selected from the group consisting of polytetrafluoroethylene, tetrafluoroethylene-perfluoroalkylvinyl ether copolymer, tetrafluoroethylene-hexafluoropropylene copolymer (4.6 fluoride), tetrafluoroethylene-ethylene copolymer, polyvinylidene difluoride (2 fluoride), and polychlorotrifluoroethylene (3 fluoride).

The method for producing a threaded connection for pipes or tubes of the present embodiment is a method for producing a threaded connection for pipes or tubes that includes a pin and a box. The pin and the box each include a contact surface having a threaded portion and an unthreaded metal contact portion. The production method of the present embodiment includes a surface roughness formation step, a Zn—Ni alloy plating layer formation step, a Cu—Sn—Zn alloy plating layer formation step and a solid lubricant coating layer formation step. In the surface roughness formation step, a surface roughness having an arithmetic mean roughness Ra of 1 to 8 μm and a maximum height roughness Rz of 10 to 40 μm is formed on at least one of the contact surfaces of the pin and the box by a blasting process. In the Zn—Ni alloy plating layer formation step, a Zn—Ni alloy plating layer consisting of a Zn—Ni alloy is formed by electroplating on the contact surface on which the aforementioned surface roughness was formed. In the Cu—Sn—Zn alloy plating layer formation step, a Cu—Sn—Zn alloy plating layer consisting of a Cu—Sn—Zn alloy is formed by electroplating after the Zn—Ni alloy plating layer is formed. In the solid lubricant coating layer formation step, a solid lubricant coating layer is formed after the Cu—Sn—Zn alloy plating layer is formed.

A threaded connection for pipes or tubes having a specific surface roughness, a Zn—Ni alloy plating layer, a Cu—Sn—Zn alloy plating layer and a solid lubricant coating layer on at least one of the contact surfaces of a pin and a box can be produced by the production method of the present embodiment. The threaded connection for pipes or tubes is excellent in misalignment resistance and corrosion resistance properties. In addition, because the threaded connection for pipes or tubes also has a high torque on shoulder resistance ΔT□, adjustment of fastening torque is easy.

Hereinafter, the threaded connection for pipes or tubes, and a method for producing the threaded connection for pipes or tubes of the present embodiment will be described in detail.

[Threaded Connection for Pipes or Tubes]

Figure 3:
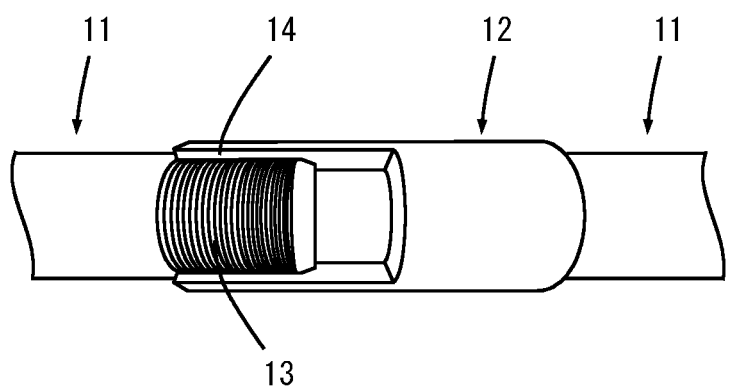
FIG. 3 is a diagram illustrating a configuration of a threaded connection for pipes or tubes according to the present embodiment.

The threaded connection for pipes or tubes includes a pin and a box. FIG. 3 is a diagram illustrating a configuration of the threaded connection for pipes or tubes according to the present embodiment. Referring to FIG. 3, the threaded connection for pipes or tubes includes a steel pipe 11 and a coupling 12. A pin 13 is formed at each end of the steel pipe 11, and the pin 13 includes a male threaded portion in its outer surface. A box 14 is formed at each end of the coupling 12, and the box 14 includes a female threaded portion in its inner surface. The coupling 12 is attached to the end of the steel pipe 11 by fastening the pin 13 and the box 14 together. On the other hand, integral-type threaded connections for pipes or tubes are also available in which the coupling 12 is not used, and one of the ends of the steel pipe 11 is used as the pin 13, and the other end of the steel pipe 11 is used as the box 14. The threaded connection for pipes or tubes of the present embodiment can be used for both a coupling-type and an integral-type threaded connection for pipes or tubes.

Figure 4:
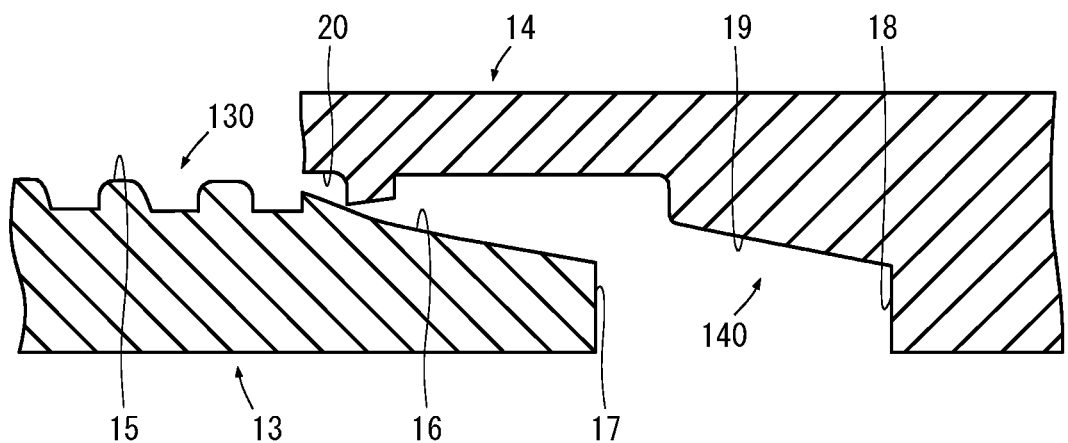
FIG. 4 is a cross-sectional view of the threaded connection for pipes or tubes according to the present embodiment.

The pin 13 and the box 14 each have a contact surface including a threaded portion and an unthreaded metal contact portion. FIG. 4 is a cross-sectional view of the threaded connection for pipes or tubes according to the present embodiment. Referring to FIG. 4, the pin 13 includes a male threaded portion 15 and an unthreaded metal contact portion. The box 14 includes a female threaded portion 20 and an unthreaded metal contact portion. The unthreaded metal contact portion is formed at the tip end of the pin 13 and the box 14, and includes metal seal portions 16 and 19 and shoulder portions 17 and 18. The portions at which the pin 13 and the box 14 come into contact with each other when they are fastened together are referred to as contact surfaces 130 and 140. Specifically, when the pin 13 and the box 14 have been fastened to each other, the two shoulder portions (shoulder portions 17 and 18) come into contact with each other, and so do the two metal seal portions (metal seal portions 16 and 19) and the two threaded portions (male threaded portion 15 and female threaded portion 20). That is, the contact surface 130 on the pin side includes the shoulder portion 17, the metal seal portion 16 and the male threaded portion 15. The contact surface 140 on the box side includes the shoulder portion 18, the metal seal portion 19 and the female threaded portion 20.

Figure 5:
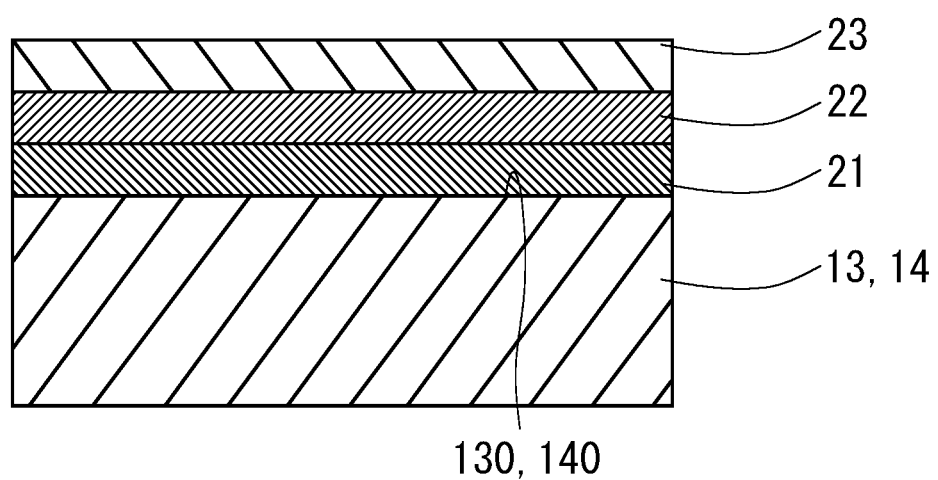
FIG. 5 is a cross-sectional view of a contact surface of the threaded connection for pipes or tubes according to the present embodiment.

FIG. 5 is a cross-sectional view of the contact surfaces 130 and 140 of the threaded connection for pipes or tubes according to the present embodiment. Referring to FIG. 5, the threaded connection for pipes or tubes has an unshown specific surface roughness on at least one of the contact surfaces 130 and 140 of the pin 13 and the box 14. The threaded connection for pipes or tubes includes a Zn—Ni alloy plating layer 21, a Cu—Sn—Zn alloy plating layer 22 and a solid lubricant coating layer 23 on the contact surface 130 or 140 having the specific surface roughness. These layers are deposited in the order of the Zn—Ni alloy plating layer 21, the Cu—Sn—Zn alloy plating layer 22 and the solid lubricant coating layer 23 from the relevant contact surface 130 or 140 side.

[Specific Surface Roughness of Contact Surface]

A surface roughness (specific surface roughness) having an arithmetic mean roughness Ra of 1 to 8 μm and a maximum height roughness Rz of 10 to 40 μm is formed on at least one of the contact surfaces 130 and 140 of the pin 13 and the box 14. The specific surface roughness is formed by a blasting process. In this case, the relevant contact surface 130 or 140 has unevenness. Therefore, the adhesion properties of the Zn—Ni alloy plating layer 21 that is described later increase because of an anchor effect. When the adhesion properties of the Zn—Ni alloy plating layer 21 increase, the threaded connection for pipes or tubes exhibits increased misalignment resistance.

In a case where the arithmetic mean roughness Ra is less than 1 μm and the maximum height roughness Rz is less than 10 μm, an adequate anchor effect is not obtained. On the other hand, in a case where the arithmetic mean roughness Ra is more than 8 μm and in a case where the maximum height roughness Rz is more than 40 μm, the galling resistance or the gas tightness may decrease.

A lower limit of the arithmetic mean roughness Ra is preferably 1.5 μm, and more preferably is 2 μm. An upper limit of the arithmetic mean roughness Ra is preferably 7 μm, and more preferably is 5 μm. A lower limit of the maximum height roughness Rz is preferably 12 μm, and more preferably is 15 μm. An upper limit of the maximum height roughness Rz is preferably 35 μm, and more preferably is 30 μm.

The arithmetic mean roughness Ra and the maximum height roughness Rz referred to in the present description are measured based on JIS B 0601 (2013). The maximum height roughness Rz and the arithmetic mean roughness Ra are measured using a scanning probe microscope (SPI 3800N, manufactured by SII NanoTechnology Inc.). The measurement conditions are the number of acquired data points of 1024×1024 in sample regions of 2 μm×2 μm as a unit of acquired data. The sampling length is 2.5 mm. The greater the arithmetic mean roughness Ra and the maximum height roughness Rz are, the more the contact area with the Zn—Ni alloy plating layer 21 increases. Therefore, the adhesion properties with respect to the Zn—Ni alloy plating layer 21 increase by an anchor effect. When the adhesion properties of the Zn—Ni alloy plating layer 21 increase, the threaded connection for pipes or tubes exhibits increased misalignment resistance.

The blasting process may be performed by a well-known method in conformity with JIS Z 0310 (2016). For example, such methods include sandblasting, shotblasting and grit blasting. A desired surface roughness can be obtained by adjusting the type and size of the abrasive grain, the blasting pressure, the angle of projection, the distance from the nozzle and the time span depending on the target object. If the size of the abrasive grain is around 100 mesh, the specific surface roughness of the present invention can be obtained comparatively easily.

[Zn—Ni Alloy Plating Layer 21]

The Zn—Ni alloy plating layer 21 consisting of a Zn—Ni alloy is formed on the contact surface 130 or 140 having the specific surface roughness. The Zn—Ni alloy plating layer 21 is formed, for example, by electroplating.

Zn that is contained in the Zn—Ni alloy plating layer 21 is a base metal. Therefore, by forming a plating layer containing Zn on the contact surface 130 or 140, the plating layer is corroded with priority relative to the steel material (sacrificial protection). As a result, the threaded connection for pipes or tubes exhibits increased corrosion resistance properties. If the order of depositing the Zn—Ni alloy plating layer 21 and the Cu—Sn—Zn alloy plating layer 22 that is described later is reversed, the effect of sacrificial protection by means of Zn will not be obtained. Accordingly, the Zn—Ni alloy plating layer 21 is formed on a contact surface that has the specific surface roughness.

The Zn—Ni alloy contains Zn and Ni, with the balance being impurities. A preferable Zn content of the Zn—Ni alloy plating layer 21 is 85 to 90 mass %, and a preferable Ni content is 10 to 15 mass %. The Zn—Ni alloy plating layer 21 has a large Zn content. Therefore, the sacrificial protection effect is large.

The lower limit of the Ni content of the Zn—Ni alloy is more preferably 12 mass %. The upper limit of the Ni content of the Zn—Ni alloy is more preferably 14 mass %. The lower limit of the Zn content of the Zn—Ni alloy is more preferably 86 mass %. The upper limit of the Zn content of the Zn—Ni alloy is more preferably 88 mass %.

The chemical composition of the Zn—Ni alloy plating layer 21 is measured by the following method. The chemical composition is measured using a handheld fluorescent X-ray analyzer (DP2000 (trade name: DELTA Premium) manufactured by JEOL Ltd.). The measurement analyzes the chemical composition at four locations on the surface (four locations at 0°, 90°, 180° and 270° in the pipe circumferential direction of the threaded connection for pipes or tubes) of the Zn—Ni alloy plating layer 21. The measured content of Zn and Ni is determined by means of an Alloy Plus mode. An amount obtained by dividing the amount of the measured content of Ni by the total content of Zn and Ni that was measured is taken as the Ni content (mass %). An amount obtained by dividing the amount of the measured content of Zn by the total content of Zn and Ni that was measured is taken as the Zn content (mass %). The Ni content (mass %) and the Zn content (mass %) are the respective arithmetic means of the measurement results for the four locations at which the chemical composition was analyzed.

The hardness of the Zn—Ni alloy plating layer 21 is preferably a micro-Vickers hardness of not less than 300. If the hardness of the Zn—Ni alloy plating layer 21 is not less than 300, the threaded connection for pipes or tubes exhibits consistently high corrosion resistance.

The lower limit of the hardness of the Zn—Ni alloy plating layer 21 is more preferably a micro-Vickers hardness of 350, and further preferably is a micro-Vickers hardness of 400. The upper limit of the hardness of the Zn—Ni alloy plating layer 21 is not particularly limited. However, the upper limit of the hardness of the Zn—Ni alloy plating layer 21 is, for example, a micro-Vickers hardness of 700.

The hardness of the Zn—Ni alloy plating layer 21 is measured as follows. Five arbitrary regions are selected in the Zn—Ni alloy plating layer 21 of the obtained threaded connection for pipes or tubes. The Vickers hardness (HV) in each of the selected regions is measured in accordance with JIS Z 2244 (2009). The test conditions are a test temperature of normal temperature (25° C.) and a test force of 2.94 N (300 gf). The mean of the obtained values (from the total of 5 places) is defined as the hardness of the Zn—Ni alloy plating layer 21.

The thickness of the Zn—Ni alloy plating layer 21 is preferably 5 to 20 μm. When the thickness of the Zn—Ni alloy plating layer 21 is 5 μm or more, the corrosion resistance properties of the threaded connection for pipes or tubes can be stably increased. When the thickness of the Zn—Ni alloy plating layer 21 is not more than 20 μm, the adhesion properties of the plating are stable. Accordingly, the thickness of the Zn—Ni alloy plating layer 21 is preferably 5 to 20 μm.

The lower limit of the thickness of the Zn—Ni alloy plating layer 21 is more preferably 6 μm, and further preferably is 8 μm. The upper limit of the thickness of the Zn—Ni alloy plating layer 21 is more preferably 18 μm, and further preferably is 15 μm.

The thickness of the Zn—Ni alloy plating layer 21 is measured as follows. A probe of an eddy current phase-type film thickness measuring instrument conforming to ISO (International Organization for Standardization) 21968 (2005) is brought into contact with the Zn—Ni alloy plating layer 21. A phase difference between a high-frequency magnetic field on the input side of the probe and an eddy current on the Zn—Ni alloy plating layer 21 that was excited by the high-frequency magnetic field is measured. The phase difference is converted into a thickness of the Zn—Ni alloy plating layer 21.

[Cu—Sn—Zn Alloy Plating Layer 22]

The Cu—Sn—Zn alloy plating layer 22 is formed on the Zn—Ni alloy plating layer 21. The Cu—Sn—Zn alloy plating layer 22 is formed, for example, by electroplating.

The Cu—Sn—Zn alloy plating layer 22 is consisting of a Cu—Sn—Zn alloy. The hardness and the fusing point of the Cu—Sn—Zn alloy plating layer 22 are high. Therefore, even if fastening and loosening are repeated, the threaded connection for pipes or tubes has a high misalignment resistance.

The Cu—Sn—Zn alloy contains Cu, Sn and Zn, with the balance being impurities. In the Cu—Sn—Zn plating layer 22, a preferable Cu content is 40 to 70 mass %, a preferable Sn content is 20 to 50 mass % and a preferable Zn content is 2 to 20 mass %.

The lower limit of the Cu content of the Cu—Sn—Zn alloy is more preferably 45 mass %, and further preferably is 50 mass %. The upper limit of the Cu content of the Cu—Sn—Zn alloy is more preferably 65 mass %, and further preferably is 60 mass %. The lower limit of the Sn content of the Cu—Sn—Zn alloy is more preferably 25 mass %, and further preferably is 30 mass %. The upper limit of the Sn content of the Cu—Sn—Zn alloy is more preferably 45 mass %, and further preferably is 40 mass %. The lower limit of the Zn content of the Cu—Sn—Zn alloy is more preferably 5 mass %, and further preferably is 10 mass %. The upper limit of the Zn content of the Cu—Sn—Zn alloy is more preferably 18 mass %, and further preferably is 15 mass %. The chemical composition of the Cu—Sn—Zn alloy plating layer 22 is measured by the same method as the method used to measure the chemical composition of the Zn—Ni alloy plating layer 21 that is described above.

The hardness of the Cu—Sn—Zn alloy plating layer 22 is preferably a micro-Vickers hardness of not less than 500. If the hardness of the Cu—Sn—Zn alloy plating layer 22 is not less than 500, the threaded connection for pipes or tubes exhibits consistently high misalignment resistance. The hardness of the Cu—Sn—Zn alloy plating layer 22 is measured by the same method as the method used to measure the hardness of the Zn—Ni alloy plating layer 21 that is described above.

The lower limit of the hardness of the Cu—Sn—Zn alloy plating layer 22 is more preferably a micro-Vickers hardness of 550, and further preferably is a micro-Vickers hardness of 600. The upper limit of the hardness of the Cu—Sn—Zn alloy plating layer 22 is not particularly limited. However, the upper limit of the hardness of the Cu—Sn—Zn alloy plating layer 22 is, for example, a micro-Vickers hardness of 800.

The thickness of the Cu—Sn—Zn alloy plating layer 22 is preferably 5 to 20 μm. When the thickness of the Cu—Sn—Zn alloy plating layer 22 is 5 μm or more, the misalignment resistance of the threaded connection for pipes or tubes can be stably increased. When the thickness of the Cu—Sn—Zn alloy plating layer 22 is not more than 20 μm, the adhesion properties of the plating are stable. Accordingly, the thickness of the Cu—Sn—Zn alloy plating layer 22 is preferably 5 to 20 μm. The thickness of the Cu—Sn—Zn alloy plating layer 22 is measured by the same method as the method used to measure thickness of the Zn—Ni alloy plating layer 21 that is described above.

The lower limit of the thickness of the Cu—Sn—Zn alloy plating layer 22 is more preferably 6 μm, and further preferably is 8 μm. The upper limit of the thickness of the Cu—Sn—Zn alloy plating layer 22 is more preferably 18 μm, and further preferably is 15 μm.

[Solid Lubricant Coating Layer 23]

The solid lubricant coating layer 23 is formed on the Cu—Sn—Zn alloy plating layer 22. The lubricity of the threaded connection for pipes or tubes is increased by the solid lubricant coating layer 23. The solid lubricant coating layer 23 contains a binder and a lubricant additive. In the present embodiment, a binder which the solid lubricant coating layer 23 contains is at least one type of resin selected from the group consisting of epoxy resin and polyamide-imide resin. In the present embodiment, the solid lubricant coating layer 23 contains fluororesin particles. As necessary, the solid lubricant coating layer 23 may contain a solvent and other components.

The respective components of the solid lubricant coating layer 23 are described in detail hereunder.

[Binder]

The binder causes the lubricant additive to bind in the solid lubricant coating layer 23. In the present embodiment, the binder is at least one type of resin selected from the group consisting of epoxy resin and polyamide-imide resin. In the present embodiment, the solid lubricant coating layer 23 may further contain another binder.

One or more types selected from the group consisting of an organic resin, an inorganic resin and a mixture of these can be used as the binder. In the case of using an organic resin, a thermosetting resin or a thermoplastic resin can be used. The thermosetting resin, for example, is one or more types selected from the group consisting of epoxy resin, polyimide resin, polycarbodiimide resin, polyethersulphone resin, polyether ether ketone resin, phenol resin, furan resin, urea resin and acrylic resin. The thermoplastic resin, for example, is one or more types selected from the group consisting of polyamide-imide resin, polyethylene resin, polypropylene resin, polystyrene resin and ethylene vinyl acetate resin.

In the case of using an inorganic resin, polymetalloxane can be used. The term "polymetalloxane" refers to a macromolecular compound in which repeated metal-oxygen bonds are the main chain backbone. Preferably, the inorganic resin is one or more types selected from the group consisting of polytitanoxane (Ti—O) and polysiloxane (Si—O). These inorganic resins are obtained by causing metal alkoxide to undergo hydrolysis and condensation. The alkoxy group of the metal alkoxide is, for example, a lower alkoxy group such as a methoxy group, ethoxy group, propoxy group, isopropoxy group, isobutoxy group, butoxy group or a tert-butoxy group.

If the melting temperature of the binder is too high, application of the composition by a hot melt process becomes difficult. On the other hand, if the melting temperature of the binder is too low, the solid lubricant coating layer 23, in high-temperature environments, may soften and consequently have decreased adhesion properties. Thus, the binder preferably contains at least one type of resin selected from the group consisting of an ethylene vinyl acetate resin having a melting temperature (or softening temperature) in the range of 80 to 320° C. and a polyolefin resin having a melting temperature (or softening temperature) in the range of 80 to 320° C. More preferably, the binder contains at least one type of resin selected from the group consisting of an ethylene vinyl acetate resin having a melting temperature (or softening temperature) in the range of 90 to 200° C. and a polyolefin resin having a melting temperature (or softening temperature) in the range of 90 to 200° C.

The ethylene vinyl acetate resin is preferably a mixture of two or more ethylene vinyl acetate resins having different melting temperatures in order to inhibit rapid softening due to a temperature increase. Likewise, the polyolefin resin is preferably a mixture of two or more polyolefin resins having different melting temperatures.

The content of the binder in the solid lubricant coating layer 23 is preferably in the range of 60 to 80 mass %. When the content of the binder is not less than 60 mass %, the solid lubricant coating layer 23 exhibits further increased adhesion properties. When the content of the binder is not greater than 80 mass %, the solid lubricant coating layer 23 retains lubricity in a more favorable manner.

The lower limit of the content of the binder in the solid lubricant coating layer 23 is more preferably 65 mass %, and further preferably is 68 mass %. The upper limit of the content of the binder in the solid lubricant coating layer 23 is more preferably 78 mass %, and further preferably is 75 mass %.

[Fluororesin Particles]

The solid lubricant coating layer 23 contains fluororesin particles.

The fluororesin particles are one or more types selected from the group consisting of PTFE (polytetrafluoroethylene), PFA (tetrafluoroethylene-perfluoroalkylvinyl ether copolymer), FEP (tetrafluoroethylene-hexafluoropropylene copolymer (4.6 fluoride)), ETFE (tetrafluoroethylene-ethylene copolymer), PVDF (polyvinylidene difluoride (2 fluoride)), and PCTFE (polychlorotrifluoro-ethylene (3 fluoride)). In the present embodiment, in particular, PTFE is preferable.

The fluororesin particles are particles of a high molecular weight polymer having a C—F bond in the molecular structure. The C—F bond of the fluororesin particles is firm. By having this molecular structure, the fluororesin particles are very excellent in chemical resistance properties, heat resistance properties and electrical characteristics. Although the fluororesin particles exhibit an extremely low coefficient of friction under a low interfacial pressure at 100° C. or less, the coefficient of friction rises in the case of a high interfacial pressure and a temperature of more than 100° C. In such case, a high torque on shoulder resistance $\Delta T\square$ can be obtained. Specifically, the fluororesin particles contribute to reducing friction during shouldering in which there is low interfacial pressure between the metal seal portions 16 and 19 and the shoulder portions 17 and 18 and the amount of frictional heat generation is still small, thereby lowering the shouldering torque. On the other hand, in the case of a high interfacial pressure and a temperature of more than 100° C. produced by frictional heat generation, the amount of friction that is generated rapidly becomes large. The fluororesin particles also make it difficult for the metal seal portions 16 and 19 and the shoulder portions 17 and 18 to cause plastic deformation even in the case of high torque. A preferable content of the fluororesin particles is in a range of 2 mass % to 20 mass %. The lower limit of the content of the fluororesin particles is more preferably 5 mass %, and further preferably is 8 mass %. The upper limit of the content of the fluororesin particles is more preferably 15 mass %, and further preferably is 12 mass %.

In the present embodiment, the solid lubricant coating layer 23 may further contain a lubricant additive.

The term "lubricant additive" generically refers to additives having lubricity. A lubricant additive lowers the coefficient of friction on the surface of the solid lubricant coating layer 23. Lubricant additives can be categorized into the following five types. The lubricant additive includes at least one type selected from the group consisting of the following (1) to (5):

(1) Lubricant additives having a particular crystal structure, such as a lamellar hexagonal crystal structure, in which slipping easily occurs and which thereby exhibits lubricity (e.g., graphite, zinc oxide, and boron nitride);

(2) Lubricant additives including a reactive element in addition to a particular crystal structure and thereby exhibiting lubricity (e.g., molybdenum disulfide, tungsten disulfide, graphite fluoride, tin sulfide, and bismuth sulfide);

(3) Lubricant additives exhibiting lubricity due to chemical reactivity (e.g., thiosulfate compounds);

(4) Lubricant additives exhibiting lubricity due to plastic or viscoplastic behavior under frictional stresses (e.g., polyamide); and (5) Lubricant additives that are in liquid form or in grease form and exhibiting lubricity by existing at the interface between the contact surfaces and preventing direct surface-to-surface contact (e.g., a perfluoropolyether (PFPE)).

Any of the above lubricant additives (1) to (5) may be employed. Two or more of the above lubricant additives (1) to (5) may be used in combination in addition to the fluororesin particles. That is, in addition to PTFE, the solid lubricant coating layer 23 may further contain one or more types of lubricant additive selected from the group consisting of graphite, zinc oxide, boron nitride, molybdenum disulfide, tungsten disulfide, graphite fluoride, tin sulfide, bismuth sulfide, thiosulfate compounds, polyamide and perfluoropolyether (PFPE).

The content of the lubricant additive in the solid lubricant coating layer 23 is preferably in a range of 10 to 25 mass %. When the content of the lubricant additive is 10 mass % or more, the torque on shoulder resistance $\Delta T\square$ is further increased. On the other hand, when the content of the lubricant additive is not more than 25 mass %, the strength of the solid lubricant coating layer 23 increases further. Therefore, wear of the solid lubricant coating layer 23 can be inhibited.

The lower limit of the content of the lubricant additive in the solid lubricant coating layer 23 is more preferably 12 mass %, and further preferably is 15 mass %. The upper limit of the content of the lubricant additive in the solid lubricant coating layer 23 is more preferably 23 mass %, and further preferably is 20 mass %.

In a case where it is necessary to dissolve or disperse the lubricant additive and the binder, a solvent is used. The solvent is not particularly limited as long as the solvent can disperse or dissolve components contained in the solid lubricant coating layer 23. An organic solvent or water can be used as the solvent. Examples of the organic solvent include toluene and isopropyl alcohol. Although most of the solvent is volatilized when forming the solid lubricant coating layer 23, for example, 1 mass % or less may remain in the solid lubricant coating layer 23.

[Other Components]

The solid lubricant coating layer 23 of the present embodiment may contain, in addition to the components described above, small amounts of additive components such as an anti-rust additive, a plasticizer, a surfactant, a coloring agent, an antioxidant agent, and an inorganic powder for adjustment of the sliding properties. Examples of the inorganic powder include a powder of titanium dioxide and a powder of bismuth oxide. The content of the other components is, for example, not more than 5 mass % in total. The composition may further include additives such as an extreme pressure agent and a liquid lubricant in very small amounts, i.e., not more than 2 mass %. The content of other components in the solid lubricant coating layer 23 is, for example, not more than 10 mass % in total.

The hardness of the solid lubricant coating layer 23 is preferably a micro-Vickers hardness in a range of 15 to 25. When the hardness of the solid lubricant coating layer 23 is in a range of 15 to 25, the torque on shoulder resistance ΔT☐ increases further. The hardness of the solid lubricant coating layer 23 is measured by the same method as the method used to measure the hardness of the Zn—Ni alloy plating layer 21 that is described above.

The lower limit of the hardness of the solid lubricant coating layer 23 is more preferably a micro-Vickers hardness of 16, and further preferably is a micro-Vickers hardness of 18. The upper limit of the hardness of the solid lubricant coating layer 23 is more preferably a micro-Vickers hardness of 24, and further preferably is a micro-Vickers hardness of 22.

The thickness of the solid lubricant coating layer 23 is preferably 10 to 40 μm. When the thickness of the solid lubricant coating layer 23 is 10 μm or more, a high lubricity can be stably obtained. On the other hand, when the thickness of the solid lubricant coating layer 23 is not more than 40 μm, the adhesion properties of the solid lubricant coating layer 23 are stable. Furthermore, when the thickness of the solid lubricant coating layer 23 is not more than 40 μm, because the thread tolerance (clearance) of the sliding surfaces widens, interfacial pressure during sliding becomes lower. Therefore, the fastening torque can be inhibited from becoming excessively high. Accordingly, the thickness of the solid lubricant coating layer 23 is preferably 10 to 40 μm.

The lower limit of the thickness of the solid lubricant coating layer 23 is more preferably 15 μm, and further preferably is 20 μm. The upper limit of the thickness of the solid lubricant coating layer 23 is more preferably 35 μm, and further preferably is 30 μm.

The thickness of the solid lubricant coating layer 23 is measured by the following method. The pin 13 or the box 14 that includes the solid lubricant coating layer 23 is prepared. The pin 13 or the box 14 is cut perpendicularly to the axial direction of the pipe. A cross-section including the solid lubricant coating layer 23 is observed by microscope. The magnification when observing the cross-section by microscope is ×500. By this means, the thickness of the solid lubricant coating layer 23 is determined. The arithmetic mean of measured values at an arbitrary three locations is taken as the thickness of the solid lubricant coating layer 23.

[Corrosion protective solid coating]

The aforementioned threaded connection for pipes or tubes has a specific surface roughness on at least one of the contact surfaces 130 and 140 of the pin 13 and the box 14. The threaded connection for pipes or tubes further includes the Zn—Ni alloy plating layer 21, the Cu—Sn—Zn alloy plating layer 22 and the solid lubricant coating layer 23 on the contact surface 130 or 140 that has the specific surface roughness. The threaded connection for pipes or tubes may further include a corrosion protective solid coating on the other of the contact surfaces 130 and 140 of the pin 13 and the box 14. As described above, the threaded connection for pipes or tubes, in some cases, is stored for a long period of time before being actually used. In such a case, the corrosion protective solid coating, if formed, increases the anticorrosive properties of the pin 13 or the box 14.

The corrosion protective solid coating, for example, is a chromate coating consisting of chromate. The chromate coating is formed by a well-known trivalent chromating treatment.

The corrosion protective solid coating is not limited to a chromate coating. A different corrosion protective solid coating contains, for example, a UV-curable resin. In this case, the corrosion protective solid coating exhibits strength sufficient to prevent breakage that may be caused by a force applied at the time of attachment of a protector. Moreover, the corrosion protective solid coating does not dissolve even when it is exposed to condensed water, associated with the dew point, during transport or storage. Furthermore, even under high temperatures of more than 40° C., the corrosion protective solid coating does not soften easily. The UV-curable resin is a resin composition well known in the art. The UV-curable resin is not particularly limited as long as it includes monomers, oligomers, and photopolymerization initiators and can be photopolymerized by irradiation with UV light to form a cured coating.

The specific surface roughness, the Zn—Ni alloy plating layer 21, the Cu—Sn—Zn alloy plating layer 22 and the solid lubricant coating layer 23 may be formed on the other contact surface 130 or 140 of the threaded connection for pipes or tubes, and the aforementioned corrosion protective solid coating may be formed on that solid lubricant coating layer 23, or the corrosion protective solid coating may be formed directly on the other contact surface 130 or 140.

[Base Metal of Threaded Connection for Pipes or Tubes]

The composition of the base metal of the threaded connection for pipes or tubes is not particularly limited. Examples of the base metal include carbon steels, stainless steels and alloy steels. Among alloy steels, high alloy steels such as duplex stainless steels that contain alloying elements such as Cr, Ni and Mo and a Ni alloy have high corrosion resistance. Therefore by using these high alloy steels as a base metal, excellent corrosion resistance is obtained in a corrosive environment that contains hydrogen sulfide or carbon dioxide or the like.

[Production Method]

The method for producing the threaded connection for pipes or tubes according to the present embodiment includes a surface roughness formation step, a Zn—Ni alloy plating layer formation step, a Cu—Sn—Zn alloy plating layer formation step, and a solid lubricant coating layer formation step. These steps are performed in the order of the surface roughness formation step, the Zn—Ni alloy plating layer formation step, the Cu—Sn—Zn alloy plating layer formation step, and the solid lubricant coating layer formation step.

[Surface Roughness Formation Step]

In the surface roughness formation step, the specific surface roughness is formed on at least one of the contact surfaces 130 and 140 of the pin 13 and the box 14. In the surface roughness formation step, the specific surface roughness is formed by the blasting process using a blasting apparatus.

The blasting process may be performed by a known method in conformity with JIS Z 0310 (2016). For example, such methods include sandblasting, shotblasting and grit blasting. For example, in the sand blasting process, a blast material (abrasive) is mixed with compressed air and the mixture is propelled onto the contact surface 130 or 140. The surface roughness of the contact surface 130 and 140 can be increased by the blasting process. The sand blasting treatment may be carried out by a method known in the art. For example, air is compressed by a compressor and a blast material is mixed with the compressed air. The blast material may be made of, for example, stainless steel, aluminum, ceramic, or alumina.

A desired specific surface roughness can be obtained by adjusting the type and size of the abrasive grain, the blasting pressure, the angle of projection, the distance from the nozzle and the time span depending on the target object. If the size of the abrasive grain is around 100 mesh, the specific surface roughness of the present invention can be obtained comparatively easily. By this means, the specific surface roughness is formed on the surface of the threaded connection for pipes or tubes. The specific surface roughness is an arithmetic mean roughness Ra in a range of 1 to 8 µm and a maximum height roughness Rz in a range of 10 to 40 µm.

[Zn—Ni Alloy Plating Layer 21 Formation Step]

In the Zn—Ni alloy plating layer 21 formation step, the Zn—Ni alloy plating layer 21 consisting of a Zn—Ni alloy is formed on the contact surface 130 or 140 on which the specific surface roughness is formed. The Zn—Ni alloy plating layer 21 is formed by electroplating. The electroplating is performed by immersing at least one of the contact surfaces 130 and 140 of the pin 13 and the box 14 on which the surface roughness was formed in a plating bath containing zinc ions and nickel ions, and conducting a current through the contact surface 130 or 140. A commercially available plating bath can be used. The plating bath preferably contains zinc ions in an amount of 1 to 100 g/L and nickel ions in an amount of 1 to 50 g/L. The electroplating conditions can be set appropriately. The electroplating conditions are, for example, a plating bath pH of 1 to 10, a plating bath temperature of 10 to 60° C., a current density of 1 to 100 A/dm$^2$ and a treatment time of 0.1 to 30 minutes.

[Cu—Sn—Zn Alloy Plating Layer 22 Formation Step]

In the Cu—Sn—Zn alloy plating layer 22 formation step, the Cu—Sn—Zn alloy plating layer 22 consisting of a Cu—Sn—Zn alloy is formed on the Zn—Ni alloy plating layer 21. The Cu—Sn—Zn alloy plating layer 22 is formed by electroplating. The electroplating is performed by immersing the contact surface 130 or 140 on which the Zn—Ni alloy plating layer 21 is formed of the pin 13 or the box 14 in a plating bath containing copper ions, tin ions and zinc ions, and conducting a current through the contact surface 130 or 140. The plating bath preferably contains copper ions in an amount of 1 to 50 g/L, tin ions in an amount of 1 to 50 g/L, and zinc ions in an amount of 1 to 50 g/L. The electroplating conditions can be set appropriately. The electroplating conditions are, for example, a plating bath pH of 1 to 14, a plating bath temperature of 10 to 60° C., a current density of 1 to 100 A/dm$^2$ and a treatment time of 0.1 to 40 minutes.

[Solid Lubricant Coating Layer 23 Formation Step]

The solid lubricant coating layer 23 formation step is performed after the Cu—Sn—Zn alloy plating layer 22 formation step. The solid lubricant coating layer 23 formation step includes an application step and a solidification step. In the application step, the aforementioned composition is applied onto the Cu—Sn—Zn alloy plating layer 22. In the solidification step, the composition that was applied onto the contact surface 130 or 140 is solidified to form the solid lubricant coating layer 23.

Firstly, the composition is prepared. The composition of a solventless type may be prepared, for example, by heating the binder to a molten state, adding the lubricant additive, anti-rust additive, and plasticizer thereto, and mixing them. The composition may be made of a powder mixture prepared by mixing all the components in powder form. The composition of a solvent type may be prepared, for example, by dissolving or dispersing the binder, lubricant additive, anti-rust additive, and plasticizer in a solvent and mixing them.

[Application Step]

In the application step, the composition is applied to the contact surface 130 or 140 by a method known in the art. For the composition of a solventless type, a hot melt process may be employed to apply the composition. In the hot melt process, the composition is heated to melt the binder to a fluid state with low viscosity. The composition in a fluid state can be sprayed from a spray gun having functions for temperature holding. The composition is heated and melted within a tank including a suitable stirring mechanism, is supplied via a metering pump to the spray head (held at a predetermined temperature) of the spray gun by a compressor, and is sprayed. The holding temperatures for the tank interior and the spray head are adjusted in accordance with the melting point of the binder in the composition. Another application method, such as brushing or dipping, may be employed in place of spray coating. The temperature to which the composition is heated is preferably higher than the melting point of the binder by 10 to 50° C. Prior to application of the composition, at least one contact surface 130 or 140, to which the composition is to be applied, of the pin 13 or of the box 14, is preferably heated to a temperature higher than the melting point of the base. This makes it possible to achieve good coating properties. In the case of the composition of a solvent type, the composition in solution form is applied to the contact surface 130 or 140 by spray coating or by another method. In this case, the viscosity of the composition is to be adjusted so that it can be applied by spraying in an environment at normal temperature and pressure.

[Solidification Step]

In the solidification step, the composition applied to the contact surface 130 or 140 is solidified to form the solid lubricant coating layer 23. In the case of the composition of a solventless type, the solid lubricant coating layer 23 is formed by cooling the composition applied to the contact surface 130 or 140 to allow the composition in a molten state to solidify. The cooling process can be carried out by a method known in the art. Examples of the cooling process include natural cooling and air cooling. In the case of the composition of a solvent type, the solid lubricant coating layer 23 is formed by drying the composition applied to the contact surface 130 or 140 to allow the composition to solidify. The drying process can be carried out by a method known in the art. Examples of the drying process include natural drying, low-temperature air drying, and vacuum drying. The solidification step may be carried out by rapid cooling using, for example, a nitrogen gas cooling system or a carbon dioxide cooling system. In the case where rapid cooling is performed, the cooling is carried out in an indirect manner at the opposite surface to the contact surface 130 or 140 (in the case of the box 14, at the outer surface of the steel pipe 11 or the coupling 12, and in the case of the pin 13, at the inner surface of the steel pipe 11). This inhibits degradation of the solid lubricant coating layer 23 that may be caused by rapid cooling.

The pin 13 or the box 14 onto which the composition was applied may be dried by heating. Commercially available direct drying equipment can be used to perform the drying by heating. By this means the composition hardens, and the solid lubricant coating layer 23 is formed on the Cu—Sn—Zn alloy plating layer 22. The conditions for the drying by heating can be appropriately set in consideration of the boiling point and fusing point or the like of each component contained in the composition.

[Formation of Corrosion Protective Solid Coating (Trivalent Chromating Treatment)]

As described above, at least one of the contact surfaces 130 and 140 of the pin 13 and the box 14 is subjected to a surface roughness formation step, a Zn—Ni alloy plating layer 21 formation step, a Cu—Sn—Zn alloy plating layer 22 formation step, and a solid lubricant coating layer 23 formation step to thereby form the specific surface roughness, the Zn—Ni alloy plating layer 21, the Cu—Sn—Zn alloy plating layer 22 and the solid lubricant coating layer 23.

On the other hand, the specific surface roughness, the Zn—Ni alloy plating layer 21, the Cu—Sn—Zn alloy plating layer 22 and the solid lubricant coating layer 23 may also be formed on the other contact surface 130 or 140 of the pin 13 or the box 14, or a plating layer and/or a corrosion protective solid coating may be formed on the other contact surface 130 or 140 of the pin 13 or the box 14. Hereunder, a case where the Zn—Ni alloy plating layer 21 and a corrosion protective solid coating composed of chromate coating are formed on the other contact surface 130 or 140 is described.

In this case, the aforementioned electroplating step is performed to form the Zn—Ni alloy plating layer 21. After the electroplating step, a trivalent chromating treatment is performed to form a corrosion protective solid coating. The trivalent chromating treatment is a treatment for forming a trivalent chromium chromate coating (chromate coating). The chromate coating formed by the trivalent chromating treatment inhibits white rust that may be formed on the surface of the Zn—Ni alloy plating layer 21. This improves the appearance of the product. The trivalent chromating treatment may be carried out by a method known in the art. For example, at least one of the contact surfaces 130 and 140 of the pin 13 and the box 14 is immersed in a chromating solution or the chromating solution is sprayed onto the contact surface 130 or 140. Thereafter, the contact surface is rinsed with water. The contact surface 130 or 140 may be immersed in the chromating solution and, after current conduction, rinsed with water. The chromating solution may be applied to the contact surface 130 or 140 and dried by heating. The treatment conditions for trivalent chromating may be set appropriately.

[Surface Preparation Treatment]

As necessary, the production method may include a surface preparation treatment step before the surface roughness formation step, the Zn—Ni alloy plating layer 21 formation step and the Cu—Sn—Zn alloy plating layer 22 formation step. The surface preparation treatment step includes, for example, pickling and alkali degreasing. In the surface preparation treatment step, oil or the like adhering to the contact surface 130 and 140 is cleaned off.

EXAMPLE

An example will be described below. In the example, the contact surface of the pin is referred to as the pin surface and the contact surface of the box is referred to as the box surface. Percent in the example means mass percent.

In the present example, VAM21 (registered trademark) manufactured by NIPPON STEEL & SUMITOMO METAL CORPORATION were used. VAM21 (registered trademark) is a threaded connection for pipes or tubes having an outside diameter of 24.448 cm (9⅝ inches) and a wall thickness of 1.199 cm (0.472 inches). The steel grade was 13Cr steel. The 13Cr steel had a composition, C: 0.19%, Si: 0.25%, Mn: 0.8%, P: 0.02%, S: 0.01%, Cu: 0.04%, Ni: 0.10%, Cr: 13.0%, Mo: 0.04%, and the balance: Fe and impurities.

A finish machine grinding was performed on the pin surface and the box surface of each test number. Thereafter, the blasting process was performed for each test number as shown in Table 2 and Table 3. A sand blasting process (abrasive grain of 100 mesh) was performed as the blasting process, and surface roughness was formed. The arithmetic mean roughness Ra and maximum height roughness Rz for each test number were as shown in Table 2 and Table 3. The arithmetic mean roughness Ra and the maximum height roughness Rz were measured based on JIS B 0601 (2013). Measurement of the arithmetic mean roughness Ra and the maximum height roughness Rz was performed using a scanning probe microscope (SPI 3800N, manufactured by SII NanoTechnology Inc.). The measurement conditions were the number of acquired data points of 1024×1024 in sample regions of 2 μm×2 μm as a unit of acquired data.

TABLE 2

| Test No. | | Blasting Process | Zn—Ni Alloy Plating Layer (micro-Vickers hardness, thickness) | Cu—Sn—Zn Alloy Plating Layer (micro-Vickers hardness, thickness) | Solid Lubricant Coating Layer (micro-Vickers hardness, thickness) | Other coating layer (Thickness) |
|---|---|---|---|---|---|---|
| 1 | Pin surface | None Ra: 0.3 μm Rz: 5.8 μm | Zn—Ni Alloy Plating Layer (450, 8 μm) | — | — | Chromate (trivalent) (0.3 μm) |
|   | Box surface | Sand blasting Ra: 2.0 μm Rz: 24.0 μm | Zn—Ni Alloy Plating Layer (450, 8 μm) | Cu—Sn—Zn Alloy Plating Layer (650, 10 μm) | Epoxy resin + 10% PTFE particles (18, 30 μm) | — |
| 2 | Pin surface | None Ra: 0.3 μm Rz: 5.8 μm | Zn—Ni Alloy Plating Layer (650, 8 μm) | — | — | Chromate (trivalent) (0.3 μm) |
|   | Box surface | Sand blasting Ra: 2.0 μm Rz: 24.0 μm | Zn—Ni Alloy Plating Layer (450, 8 μm) | Cu—Sn—Zn Alloy Plating Layer (650, 10 μm) | Polyamide-imide resin + 5% PTFE particles (22, 30 μm) | — |

TABLE 2-continued

| Test No. | | Blasting Process | Zn—Ni Alloy Plating Layer (micro-Vickers hardness, thickness) | Cu—Sn—Zn Alloy Plating Layer (micro-Vickers hardness, thickness) | Solid Lubricant Coating Layer (micro-Vickers hardness, thickness) | Other coating layer (Thickness) |
|---|---|---|---|---|---|---|
| 3 | Pin surface | Sand blasting Ra: 1.6 μm Rz: 20.0 μm | Zn—Ni Alloy Plating Layer (450, 8 μm) | Cu—Sn—Zn Alloy Plating Layer (650, 10 μm) | Epoxy resin + 10% PTFE particles (22, 30 μm) | — |
| | Box surface | Sand blasting Ra: 1.6 μm Rz: 20.0 μm | Zn—Ni Alloy Plating Layer (450, 8 μm) | Cu—Sn—Zn Alloy Plating Layer (500, 10 μm) | Epoxy resin + 10% PTFE particles (22, 30 μm) | — |
| 4 | Pin surface | Sand blasting Ra: 1.6 μm Rz: 20.0 μm | Zn—Ni Alloy Plating Layer (300, 8 μm) | Cu—Sn—Zn Alloy Plating Layer (500, 10 μm) | Epoxy resin + 10% PTFE particles (16, 30 μm) | — |
| | Box surface | None Ra: 0.3 μm Rz: 5.8 μm | Zn—Ni Alloy Plating Layer (450, 8 μm) | — | — | Chromate (trivalent) (0.3 μm) |
| 5 | Pin surface | None Ra: 0.3 μm Rz: 5.8 μm | Zn—Ni Alloy Plating Layer (450, 8 μm) | — | — | Chromate (trivalent) (0.3 μm) |
| | Box surface | Sand blasting μm: 3.5 μm Rz: 32.2 μm | Zn—Ni Alloy Plating Layer (450, 8 μm) | Cu—Sn—Zn Alloy Plating Layer (650, 10 μm) | Epoxy resin + 10% PTFE particles (12, 30 μm) | — |
| 6 | Pin surface | None Ra: 0.3 μm Rz: 5.8 μm | Zn—Ni Alloy Plating Layer (450, 8 μm) | — | — | Chromate (trivalent) (0.3 μm) |
| | Box surface | Sand blasting Ra: 2.0 μm Rz: 24.0 μm | Zn—Ni Alloy Plating Layer (450, 8 μm) | — | Epoxy resin + 10% PTFE particles (18, 30 μm) | — |

TABLE 3

| Test No. | | Blasting Process | Zn—Ni Alloy Plating Layer (micro-Vickers hardness, thickness) | Cu—Sn—Zn Alloy Plating Layer (micro-Vickers hardness, thickness) | Solid Lubricant Coating Layer (micro-Vickers hardness, thickness) | Other coating layer (Thickness) |
|---|---|---|---|---|---|---|
| 7 | Pin surface | None Ra: 0.3 μm Rz: 5.8 μm | Zn—Ni Alloy Plating Layer (450, 8 μm) | — | — | Chromate (trivalent) (0.3 μm) |
| | Box surface | Sand blasting Ra: 2.0 μm Rz: 24.0 μm | — | Cu—Sn—Zn Alloy Plating Layer (650, 10 μm) | Epoxy resin + 10% PTFE particles (18, 30 μm) | — |
| 8 | Pin surface | None μm: 0.3 μm Rz: 5.8 μm | Zn—Ni Alloy Plating Layer (450, 8 μm) | — | — | Chromate (trivalent) (0.3 μm) |
| | Box surface | Sand blasting Ra: 2.0 μm Rz: 24.0 μm | Cu—Sn—Zn Alloy Plating Layer (650, 10 μm) | Zn—Ni Alloy Plating Layer (450, 8 μm) | Epoxy resin + 10% PTFE particles (18, 30 μm) | — |
| 9 | Pin surface | None Ra: 0.3 μm Rz: 5.8 μm | Zn—Ni Alloy Plating Layer (450, 8 μm) | — | — | Chromate (trivalent) (0.3 μm) |
| | Box surface | None Ra: 0.3 μm Rz: 5.8 μm | Zn—Ni Alloy Plating Layer (450, 8 μm) | Cu—Sn—Zn Alloy Plating Layer (650, 10 μm) | Epoxy resin + 10% PTFE particles (18, 30 μm) | — |
| 10 | Pin surface | None Ra: 0.3 μm Rz: 5.8 μm | Zn—Ni Alloy Plating Layer (450, 8 μm) | — | — | Chromate (trivalent) (0.3 μm) |
| | Box surface | Sand blasting Ra: 2.0 μm Rz: 24.0 μm | Zn—Ni Alloy Plating Layer (450, 8 μm) | Cu—Sn—Zn Alloy Plating Layer (650, 10 μm) | Epoxy resin + 10% MoS$_2$ particles (18, 30 μm) | — |
| 11 | Pin surface | None Ra: 0.3 μm Rz: 5.8 μm | Zn—Ni Alloy Plating Layer (450, 8 μm) | — | — | Chromate (trivalent) (0.3 μm) |
| | Box surface | Sand blasting Ra: 2.0 μm Rz: 24.0 μm | Zn—Ni Alloy Plating Layer (450, 8 μm) | Cu—Sn—Zn Alloy Plating Layer (650, 10 μm) | Polyamide-imide resin + 10% graphite particles (18, 30 μm) | — |
| 12 | Pin surface | None Ra: 0.3 μm Rz: 5.8 μm | Zn—Ni Alloy Plating Layer (450, 8 μm) | — | — | Chromate (trivalent) (0.3 μm) |

TABLE 3-continued

| Test No. | Blasting Process | Zn—Ni Alloy Plating Layer (micro-Vickers hardness, thickness) | Cu—Sn—Zn Alloy Plating Layer (micro-Vickers hardness, thickness) | Solid Lubricant Coating Layer (micro-Vickers hardness, thickness) | Other coating layer (Thickness) |
|---|---|---|---|---|---|
| Box surface | Sand blasting Ra: 2.0 μm Rz: 24.0 μm | Zn—Ni Alloy Plating Layer (450, 8 μm) | Cu—Sn—Zn Alloy Plating Layer (650, 10 μm) | Polyethylene Homopolymer + Liquid Poly(alkyl methacrylate) + 3.5% Graphite Fluoride or the like (—, 35 μm) | — |

Thereafter, the Zn—Ni alloy plating layers, Cu—Sn—Zn alloy plating layers, solid lubricant coating layers and/or corrosion protective solid coating shown in Table 2 and Table 3 were formed and the pin and box of each test number were prepared.

The methods for forming the Zn—Ni alloy plating layer, the Cu—Sn—Zn alloy plating layer, the solid lubricant coating layer, and corrosion protective solid coating were as described hereunder. The hardness and thickness of each of Zn—Ni alloy plating layer, Cu—Sn—Zn alloy plating layer, solid lubricant coating layer and corrosion protective solid coating were as shown in Table 2 and Table 3. Note that, the solid lubricant coating layer formed on the box surface in Test No. 12 was extremely soft, and the micro-Vickers hardness could not be measured.

[Test No. 1]

In Test No. 1, the pin surface was subjected to Zn—Ni alloy plating by electroplating to form a Zn—Ni alloy plating layer thereon. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 A/dm$^2$, and a treatment time of 18 minutes. The Zn—Ni alloy plating layer had a composition of Zn: 85% and Ni: 15%. Furthermore, a trivalent chromating treatment was performed on the obtained Zn—Ni alloy plating layer to form corrosion protective solid coating. The trivalent chromating treatment solution used was DAIN Chromate TR-02 (trade name) manufactured by Daiwa Fine Chemicals Co., Ltd. The trivalent chromating treatment was performed under conditions of a bath pH of 4.0, a bath temperature of 25° C., and a treatment time of 50 seconds.

Surface roughness having an arithmetic mean roughness Ra and a maximum height roughness Rz as shown in Table 2 was formed on the box surface by a blasting process. A sand blasting process (abrasive grain of 100 mesh) was performed as the blasting process. A Zn—Ni alloy plating layer was formed on the box surface having the surface roughness in the same manner as employed for the pin. Cu—Sn—Zn alloy plating was performed by electroplating to form a Cu—Sn—Zn alloy plating layer on the Zn—Ni alloy plating layer. The Cu—Sn—Zn alloy plating bath used was a plating bath manufactured by NIHON KAGAKU SANGYO CO., LTD. The Cu—Sn—Zn alloy plating layer was formed by electroplating. The electroplating was performed under conditions of a plating bath pH of 14, a plating bath temperature of 45° C., a current density of 2 A/dm$^2$, and a treatment time of 40 minutes. The Cu—Sn—Zn alloy plating layer had a composition of Cu: 60%, Sn: 30% and Zn: 10%. Furthermore, a composition for solid lubricant coating layer formation was applied onto the obtained Cu—Sn—Zn alloy plating layer. The composition for solid lubricant coating layer formation contained an epoxy resin (22%), PTFE particles (10%), solvents (18% in total), water (40%) and other additives (including a pigment) (10%). The composition for solid lubricant coating layer formation was applied by spraying, and thereafter was dried by heating at 90° C. for five minutes to form a solid lubricant coating layer.

[Test No. 2]

In Test No. 2, the pin surface was subjected to electroplating to form a Zn—Ni alloy plating layer thereon. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 A/dm$^2$, and a treatment time of 18 minutes. The Zn—Ni alloy plating layer had a composition of Zn: 85% and Ni: 15%. A trivalent chromating treatment was performed on the Zn—Ni alloy plating layer in the same manner as employed for the pin of Test No. 1.

Surface roughness, a Zn—Ni alloy plating layer and a Cu—Sn—Zn alloy plating layer were formed on the box surface in the same manner as employed for the box of Test No. 1. A composition for solid lubricant coating layer formation was applied onto the Cu—Sn—Zn alloy plating layer. The composition for solid lubricant coating layer formation contained a polyamide-imide resin (22%), PTFE particles (5%), solvents (18% in total), water (40%) and other additives (including a pigment) (15%). The composition for solid lubricant coating layer formation was applied by spraying, and thereafter was dried by heating at 90° C. for five minutes to form a solid lubricant coating layer.

[Test No. 3]

In Test No. 3, surface roughness, a Zn—Ni alloy plating layer and a Cu—Sn—Zn alloy plating layer were formed on each of the pin and the box in the same manner as employed for the box of Test No. 1. For the box, the Cu—Sn—Zn alloy plating bath used was a plating bath manufactured by NIHON KAGAKU SANGYO CO., LTD, and the electroplating was performed under conditions of a plating bath pH of 14, a plating bath temperature of 45° C., a current density of 2 A/dm$^2$, and a treatment time of 40 minutes. A composition for solid lubricant coating layer formation was applied onto the Cu—Sn—Zn alloy plating layer of the pin and the box. The composition for solid lubricant coating layer formation contained an epoxy resin (22%), PTFE particles (10%), solvents (18% in total), water (40%) and other additives (including a pigment) (10%). The composition for solid lubricant coating layer formation was applied by spraying, and thereafter was dried by heating at 90° C. for five minutes. After being dried by heating, curing was further performed for 20 minutes at 210° C., and a solid lubricant coating layer was formed.

[Test No. 4]

In Test No. 4, surface roughness was formed on the pin by a blasting process in the same manner as employed for the box of Test No. 1. The pin on which surface roughness was formed was subjected to Zn—Ni alloy plating by electroplating to form a Zn—Ni alloy plating layer thereon. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 A/dm$^2$, and a treatment time of 18 minutes. The Zn—Ni alloy plating layer had a composition of Zn: 85% and Ni: 15%. Cu—Sn—Zn alloy plating was performed by electroplating to form a Cu—Sn—Zn alloy plating layer on the Zn—Ni alloy plating layer. The Cu—Sn—Zn alloy plating bath used was a plating bath manufactured by NIHON KAGAKU SANGYO CO., LTD. The Cu—Sn—Zn alloy plating layer was formed by electroplating. The electroplating was performed under conditions of a plating bath pH of 14, a plating bath temperature of 45° C., a current density of 2 A/dm$^2$, and a treatment time of 40 minutes. The Cu—Sn—Zn alloy plating layer had a composition of Cu: 60%, Sn: 30% and Zn: 10%. Furthermore, a composition for solid lubricant coating layer formation was applied onto the obtained Cu—Sn—Zn alloy plating layer. The composition for solid lubricant coating layer formation contained an epoxy resin (22%), PTFE particles (10%), solvents (18% in total), water (40%) and other additives (including a pigment) (10%). The composition for solid lubricant coating layer formation was applied by spraying, and thereafter was dried by heating at 90° C. for five minutes to form a solid lubricant coating layer. In the same manner as employed for the pin of Test No. 1, a Zn—Ni alloy plating layer was formed on the box, and a trivalent chromating treatment was performed thereon.

[Test No. 5]

In Test No. 5, in the same manner as employed for the pin of Test No. 1, a Zn—Ni alloy plating layer was formed on the pin, and a trivalent chromating treatment was performed thereon. Surface roughness, a Zn—Ni alloy plating layer and a Cu—Sn—Zn alloy plating layer were formed on the box in the same manner as employed for the box of Test No. 1. A composition for solid lubricant coating layer formation was applied onto the obtained Cu—Sn—Zn alloy plating layer. The composition for solid lubricant coating layer formation contained an epoxy resin (22%), PTFE particles (10%), solvents (18% in total), water (40%) and other additives (including a pigment) (10%). The composition for solid lubricant coating layer formation was applied by spraying, and thereafter was dried by heating at 90° C. for five minutes. After being dried by heating, curing was further performed for 20 minutes at 190° C., and a solid lubricant coating layer was formed.

[Test No. 6]

In Test No. 6, in the same manner as employed for the pin of Test No. 1, a Zn—Ni alloy plating layer was formed on the pin, and a trivalent chromating treatment was performed thereon. Surface roughness, a Zn—Ni alloy plating layer and a composition for solid lubricant coating layer formation were formed on the box under the same conditions as the conditions employed for the box of Test No. 1. That is, Test No. 6 was the same as Test No. 1 except for the point that a Cu—Sn—Zn alloy plating layer was not formed on the box.

[Test No. 7]

In Test No. 7, in the same manner as employed for the pin of Test No. 1, a Zn—Ni alloy plating layer was formed on the pin, and a trivalent chromating treatment was performed thereon. Surface roughness, a Cu—Sn—Zn alloy plating layer and a solid lubricant coating layer were formed on the box in the same manner as employed for the box of Test No. 1. That is, Test No. 7 was the same as Test No. 1 except for the point that a Zn—Ni alloy plating layer was not formed on the box.

[Test No. 8]

In Test No. 8, in the same manner as employed for the pin of Test No. 1, a Zn—Ni alloy plating layer was formed on the pin, and a trivalent chromating treatment was performed thereon. A surface roughness formation step, a Cu—Sn—Zn alloy plating layer formation step, a Zn—Ni alloy plating layer formation step and a solid lubricant coating layer formation step were performed on the box in that order. The respective steps were performed under the same conditions as the conditions employed for the corresponding steps performed on the box of Test No. 1. That is, the respective layers were formed on the box in a manner in which the positions of the Zn—Ni alloy plating layer and the Cu—Sn—Zn alloy plating layer of the box of Test No. 1 were reversed. In Test No. 8, the Cu—Sn—Zn alloy plating layer was formed at a position where the Zn—Ni alloy plating layer should be formed and the Zn—Ni alloy plating layer was formed at a position where the Cu—Sn—Zn alloy plating layer should be formed. Therefore, in Table 3, Cu—Sn—Zn alloy plating layer is described in the column of the Zn—Ni alloy plating layer and Zn—Ni alloy plating layer is described in the column of the Cu—Sn—Zn alloy plating layer.

[Test No. 9]

In Test No. 9, in the same manner as employed for the pin of Test No. 1, a Zn—Ni alloy plating layer was formed on the pin, and a trivalent chromating treatment was performed thereon. A Zn—Ni alloy plating layer, a Cu—Sn—Zn alloy plating layer and a solid lubricant coating layer were formed on the box under the same conditions as the conditions employed for the box of Test No. 1. That is, the surface roughness of Test No. 1 was not formed on the box of Test No. 9.

[Test No. 10]

In Test No. 10, in the same manner as employed for the pin of Test No. 1, a Zn—Ni alloy plating layer was formed on the pin, and a trivalent chromating treatment was performed thereon. Surface roughness, a Zn—Ni alloy plating layer and a Cu—Sn—Zn alloy plating layer were formed on the box in the same manner as employed for the box of Test No. 1. A composition for solid lubricant coating layer formation was applied onto the obtained Cu—Sn—Zn alloy plating layer. The composition for solid lubricant coating layer formation contained epoxy resin (22%), MoS$_2$ particles (10%), solvents (18% in total), water (40%) and other additives (including a pigment) (10%). The composition for solid lubricant coating layer formation was applied by spraying, and thereafter was dried by heating at 90° C. for five minutes to form a solid lubricant coating layer.

[Test No. 11]

In Test No. 11, in the same manner as employed for the pin of Test No. 1, a Zn—Ni alloy plating layer was formed on the pin, and a trivalent chromating treatment was performed thereon. Surface roughness, a Zn—Ni alloy plating layer and a Cu—Sn—Zn alloy plating layer were formed on the box in the same manner as employed for the box of Test No. 1. A composition for solid lubricant coating layer formation was applied onto the obtained Cu—Sn—Zn alloy plating layer. The composition for solid lubricant coating layer formation contained polyamide-imide resin (22%), graphite particles (10%), solvents (18% in total), water (40%) and other additives (including a pigment) (10%). The composition for solid lubricant coating layer formation was applied by spraying, and thereafter was dried by heating at 90° C. for five minutes to form a solid lubricant coating layer.

[Test No. 12]

In Test No. 12, the pin surface was subjected to Zn—Ni alloy plating by electroplating to form a Zn—Ni alloy plating layer thereon. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 A/dm$^2$, and a treatment time of 18 minutes. The Zn—Ni alloy plating layer had a composition of Zn: 85% and Ni: 15%. Furthermore, a trivalent chromating treatment was performed on the obtained Zn—Ni alloy plating layer to form a corrosion protective solid coating. The trivalent chromating treatment solution used was DAIN Chromate TR-02 (trade name) manufactured by Daiwa Fine Chemicals Co., Ltd. The trivalent chromating treatment was performed under conditions of a bath pH of 4.0, a bath temperature of 25° C., and a treatment time of 50 seconds.

Surface roughness having an arithmetic mean roughness Ra and a maximum height roughness Rz as shown in Table 3 was formed on the box surface by a blasting process. A sand blasting process (abrasive grain of 100 mesh) was performed as the blasting process. A Zn—Ni alloy plating layer was formed on the box surface having the surface roughness in the same manner as employed for the pin. The Zn—Ni alloy plating layer was subjected to Cu—Sn—Zn alloy plating by electroplating to form a Cu—Sn—Zn alloy plating layer thereon. The Cu—Sn—Zn alloy plating bath used was a plating bath manufactured by NIHON KAGAKU SANGYO CO., LTD. The Cu—Sn—Zn alloy plating layer was formed by electroplating. The electroplating was performed under conditions of a plating bath pH of 14, a plating bath temperature of 45° C., a current density of 2 A/dm$^2$, and a treatment time of 40 minutes. The Cu—Sn—Zn alloy plating layer had a composition of Cu: 60%, Sn: 30% and Zn: 10%. Furthermore, a composition for solid lubricant coating layer formation was applied onto the Cu—Sn—Zn alloy plating layer. The composition for solid lubricant coating layer formation contained: polyethylene homopolymer (product name Cowax™ PE 520, manufactured by Clariant, 9%), carnauba wax (15%), zinc stearate (15%), liquid poly(alkyl methacrylate) (product name VISCOPLEX™ 6-950, manufactured by RohMax, 5%), corrosion inhibitor (product name Alox™ 606, manufactured by Lubrizol Corporation, 40%), graphite fluoride (3.5%), zinc oxide (1%), titanium dioxide (5%), bismuth trioxide (5%), silicone (dimethylpolysiloxane: 1%), and antioxidant agents (product names: Irganox™ L150: 0.3% and Irgafos™ 168: 0.2%; manufactured by Ciba-Gerigy). The method of applying the composition for solid lubricant coating layer formation was as follows. The composition for solid lubricant coating layer formation was heated to 150° C. in a tank equipped with a stirring mechanism to make the composition into a molten state, and the box surface that had undergone the aforementioned surface preparation treatment was also preheated to 130° C. by induction heating. The composition for solid lubricant coating layer formation that was in a molten state was applied using a spray gun having a spray head with a temperature maintaining function, and thereafter cooled to form a solid lubricant coating layer.

[Fastening Performance]

Fastening performance was evaluated with respect to the galling resistance and the torque on shoulder resistance ΔT□

[Galling Resistance Evaluation Test]

The galling resistance was evaluated by means of two kinds of repeated fastening tests. The two kinds of tests were an evaluation test by hand tightening, and a misalignment resistance evaluation test.

[Evaluation Test by Hand Tightening]

Using the pins and boxes of Test No. 1 to Test No. 12, fastening was performed until threads intermeshed at an initial stage of fastening by hand tightening (state of fastening by human power). After the threads were fastened by hand tightening, fastening and loosening using a power tong were repeated, and the galling resistance was evaluated. Each time one cycle of fastening and loosening was completed, the pin surface and box surface were visually observed. The occurrence of galling was examined by visual inspection. When the galling was minor and was repairable, the galling flaws were corrected and the test was continued. The number of times that fastening and loosening could be performed without unrepairable galling occurring was measured. The results are shown in the "Hand Tightening" column in Table 4. In Table 4, the value "20<" means that the number of times that fastening and loosening could be performed was more than 20 times.

[Misalignment Resistance Evaluation Test]

Using the pins and boxes of Test No. 1 to Test No. 12, the threads were fastened using a power tong from the start, without performing hand tightening. Consequently, fastening and loosening that was accompanied by misalignment was repeated, and the misalignment resistance was evaluated. A toe angle θ of the misalignment was 5°. The fastening and loosening was performed under conditions of a tightening speed of 10 rpm and a tightening torque of 42.8 kN·m. Each time one cycle of fastening and loosening was completed, the pin surface and box surface were visually observed. The occurrence of galling was examined by visual inspection. When the galling was minor and was repairable, the galling flaws were corrected and the test was continued. The number of times that fastening and loosening could be performed without unrepairable galling occurring was measured. The results are shown in Table 4. In Table 4, the value "20<" means that the number of times that fastening and loosening could be performed was more than 20 times.

TABLE 4

| | Fastening Performance | | Corrosion |
| | Galling Resistance | | Torque On Resistance | |
| Test No. | Hand-tightening (times) | Misalignment Resistance (times) | Shoulder Resistance ΔT□ | Properties Salt Spray Test |
| --- | --- | --- | --- | --- |
| 1 | 20< | 20< | 125 | Box: Rust-free after 4000 Hours |
| 2 | 20< | 20< | 112 | Box: Rust-free after 4000 Hours |
| 3 | 20< | 20< | 135 | Pin/Box: Rust-free after 4000 Hours |

TABLE 4-continued

| Test No. | Fastening Performance | | Corrosion | |
| --- | --- | --- | --- | --- |
| | Galling Resistance | | Torque On Resistance | |
| | Hand-tightening (times) | Misalignment Resistance (times) | Shoulder Resistance ΔT☐ | Properties Salt Spray Test |
| 4 | 15 | 10 | 115 | Pin: Rust-free after 4000 Hours |
| 5 | 15 | 12 | 127 | Box: Rust-free after 4000 Hours |
| 6 | 4 | 2 | 110 | Box: Rust-free after 1500 Hours |
| 7 | 10 | 10 | 123 | Box: Rust found after 500 Hours |
| 8 | 5 | 5 | 118 | Box: Rust found after 750 Hours |
| 9 | 8 | 8 | 124 | Box: Rust-free after 1500 Hours |
| 10 | 20< | 20< | 60 | Box: Rust-free after 4000 Hours |
| 11 | 20< | 20< | 75 | Box: Rust-free after 4000 Hours |
| 12 | 12 | 10 | 65 | Box: Rust-free after 4000 Hours |

[Test for Measuring the Torque on Shoulder Resistance ΔT☐]

Figure 6:
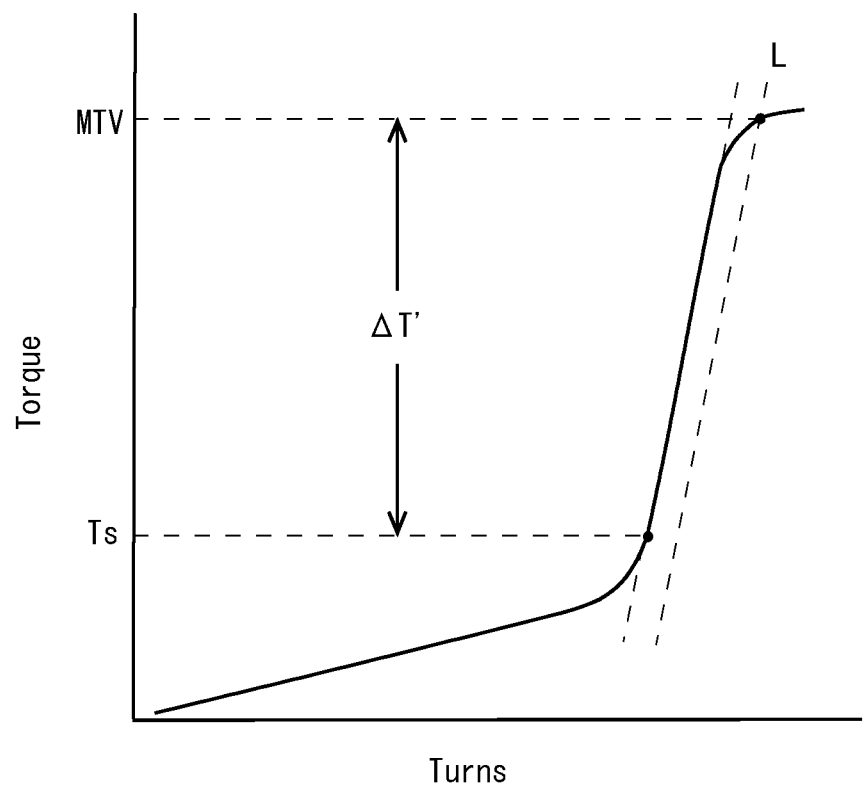
FIG. 6 is a graph for describing torque on shoulder resistance $\Delta T\square$ in an example.

Using the pins and boxes of Test No. 1 to Test No. 12, the torque on shoulder resistance ΔT☐ was measured. Specifically, fastening was performed under conditions of a tightening speed of 10 rpm and a tightening torque of 42.8 kN·m. The torque at the time of fastening was measured, and a torque chart as illustrated in FIG. 6 was prepared. Reference characters "Ts" in FIG. 6 denote the shouldering torque. Reference characters "MTV" in FIG. 6 denote a torque value at which a line segment L and the torque chart intersect. The line segment L is a straight line that has the same slope as the slope of a linear region of the torque chart after shouldering, and for which the number of turns is 0.2% more in comparison to the aforementioned linear region. Normally, Ty (yield torque) is used when measuring the torque on shoulder resistance ΔT☐ However, in the present example, the yield torque (boundary between a linear region and a non-linear region in the torque chart after shouldering) was indistinct. Therefore, MTV was defined using the line segment L. The difference between MTV and Ts was taken as the torque on shoulder resistance ΔT☐ The torque on shoulder resistance ΔT☐ was determined as a relative value when taking a numerical value obtained when an API standards dope was used instead of a solid lubricant coating layer in Test No. 1 as a reference (100). The results are shown in Table 4.

The term "API standards dope" refers to compound grease for threads for oil country tubular goods that is manufactured in accordance with API BUL 5A2. It is defined that the composition of the API standards dope adopts grease as a base material, and contains, graphite powder: 18±1.0%, lead powder: 30.5±0.6%, and copper flake: 3.3±0.3%. Note that, it is understood that, within this component range, compound greases for threaded connection for oil country tubular goods have equivalent performance.

[Corrosion Resistance Properties]
[Salt Spray Test]

A salt spray test was conducted with respect to the box surface of Test No. 1 to Test No. 12. The salt spray test was conducted based on a method described in JIS Z 2371 (2015). The size of the test specimen was 70 mm×150 mm, and the thickness was 1 mm. The time until red rust occurred on the test specimen surface of the respective Test Nos. was measured by visual inspection. The results are shown in Table 4. Note that the testing time was set as a maximum of 4000 hours. If rust did not occur after not less than 1500 hours, it was determined that there was no problem with respect to anti-rust properties during long-term storage.

[Evaluation Results]

Referring to Table 2 to Table 4, the threaded connections for pipes or tubes of Test No. 1 to Test No. 5 had, on at least one of the contact surfaces of the pin and the box, surface roughness having an arithmetic mean roughness Ra of 1 to 8 μm and a maximum height roughness Rz of 10 to 40 μm, a Zn—Ni alloy plating layer, a Cu—Sn—Zn alloy plating layer and a solid lubricant coating layer. Further, the order of depositing the respective layers was also appropriate. Therefore, in cases where there was hand tightening and also in cases accompanied by misalignment, even when fastening and loosening was repeated 10 times, galling did not occur, and excellent galling resistance was exhibited. Furthermore, the torque on shoulder resistance ΔT☐ was more than 100. In addition, the result of the salt spray test was "Rust-free after 4000 Hours", and thus excellent corrosion resistance properties were exhibited.

In Test No. 1 to Test No. 3, the hardness of the solid lubricant coating layer is a micro-Vickers hardness of 15 or more. Therefore, the galling resistance was high compared to Test No. 5.

On the other hand, a Cu—Sn—Zn alloy plating layer was not formed on the box surface of Test No. 6. Therefore, the galling resistance was low.

A Zn—Ni alloy plating layer was not formed on the box surface of Test No. 7. Therefore, the galling resistance was low. In addition, in the salt spray test, rust (pitting) occurred after 500 hours, and the corrosion resistance properties were low.

The order of depositing the Zn—Ni alloy plating layer and the Cu—Sn—Zn alloy plating layer was reversed for the box surface of Test No. 8. Therefore, the galling resistance was low. In addition, in the salt spray test, rust (pitting) occurred after 750 hours, and the corrosion resistance properties were low.

A blasting process was not performed on the box surface of Test No. 9. Consequently, the arithmetic mean roughness Ra and the maximum height roughness Rz were both below the range of the present invention, and the galling resistance was low.

The solid lubricant coating layer on the box surface of Test No. 10 did not include fluororesin particles. Therefore, the torque on shoulder resistance ΔT☐ was less than 100.

The solid lubricant coating layer on the box surface of Test No. 11 did not include fluororesin particles. Therefore, the torque on shoulder resistance ΔT☐ was less than 100.

The composition of the solid lubricant coating layer applied to the box surface of Test No. 12 did not contain either epoxy resin or polyamide-imide resin. Therefore, the torque on shoulder resistance ΔT☐ was less than 100. It is considered that this is because the coefficient of friction of the solid lubricant coating layer was low.

An embodiment of the present invention has been described above. However, the foregoing embodiment is merely an example for implementing the present invention. Accordingly, the present invention is not limited to the above embodiment, and the above embodiment can be appropriately modified within a range which does not deviate from the gist of the present invention.

REFERENCE SIGNS LIST 3, 13: Pin
14: Box
15: Male threaded portion
16, 19: Metal seal portion
17, 18: Shoulder portion
20: Female threaded portion
21: Zn—Ni alloy plating layer
22: Cu—Sn—Zn alloy plating layer
23: Solid lubricant coating layer
130, 140: Contact surface The invnention claimed is:

1. A threaded connection for pipes or tubes, the threaded connection comprising a pin and a box,
the pin and the box each comprising a contact surface having a threaded portion and an unthreaded metal contact portion,
at least one of the contact surfaces of the pin and the box having surface roughness having an arithmetic mean roughness Ra in a range of 1 to 8 µm and a maximum height roughness Rz in a range of 10 to 40 µm,
on the contact surface having the surface roughness, the threaded connection for pipes or tubes including:
a Zn—Ni alloy plating layer consisting of a Zn—Ni alloy,
a Cu—Sn—Zn alloy plating layer consisting of a Cu—Sn—Zn alloy on the Zn—Ni alloy plating layer, and
a solid lubricant coating layer on the Cu—Sn—Zn alloy plating layer,
the solid lubricant coating layer containing fluororesin particles and at least one type of resin selected from the group consisting of epoxy resin and polyamide-imide resin.

2. The threaded connection for pipes or tubes according to claim 1, wherein a hardness of the Zn—Ni alloy plating layer is a micro-Vickers hardness of 300 or more, and a thickness of the Zn—Ni alloy plating layer is in a range of 5 to 20 µm.

3. The threaded connection for pipes or tubes according to claim 2, wherein a hardness of the Cu—Sn—Zn alloy plating layer is a micro-Vickers hardness of 500 or more, and a thickness of the Cu—Sn—Zn alloy plating layer is in a range of 5 to 20 µm.

4. The threaded connection for pipes or tubes according to claim 3, wherein the fluororesin particles are one or more types selected from the group consisting of polytetrafluoroethylene, tetrafluoroethylene-perfluoroalkylvinyl ether copolymer, tetrafluoroethylene-hexafluoropropylene copolymer (4.6 fluoride), tetrafluoroethylene-ethylene copolymer, polyvinylidene difluoride (2 fluoride), and polychlorotrifluoro-ethylene (3 fluoride).

5. The threaded connection for pipes or tubes according to claim 3, wherein a hardness of the solid lubricant coating layer is a micro-Vickers hardness in a range of 15 to 25, and a thickness of the solid lubricant coating layer is in a range of 10 to 40 µm.

6. The threaded connection for pipes or tubes according to claim 5, wherein the fluororesin particles are one or more types selected from the group consisting of polytetrafluoroethylene, tetrafluoroethylene-perfluoroalkylvinyl ether copolymer, tetrafluoroethylene-hexafluoropropylene copolymer (4.6 fluoride), tetrafluoroethylene-ethylene copolymer, polyvinylidene difluoride (2 fluoride), and polychlorotrifluoro-ethylene (3 fluoride).

7. The threaded connection for pipes or tubes according to claim 2, wherein a hardness of the solid lubricant coating layer is a micro-Vickers hardness in a range of 15 to 25, and a thickness of the solid lubricant coating layer is in a range of 10 to 40 µm.

8. The threaded connection for pipes or tubes according to claim 7, wherein the fluororesin particles are one or more types selected from the group consisting of polytetrafluoroethylene, tetrafluoroethylene-perfluoroalkylvinyl ether copolymer, tetrafluoroethylene-hexafluoropropylene copolymer (4.6 fluoride), tetrafluoroethylene-ethylene copolymer, polyvinylidene difluoride (2 fluoride), and polychlorotrifluoro-ethylene (3 fluoride).

9. The threaded connection for pipes or tubes according to claim 2, wherein the fluororesin particles are one or more types selected from the group consisting of polytetrafluoroethylene, tetrafluoroethylene-perfluoroalkylvinyl ether copolymer, tetrafluoroethylene-hexafluoropropylene copolymer (4.6 fluoride), tetrafluoroethylene-ethylene copolymer, polyvinylidene difluoride (2 fluoride), and polychlorotrifluoro-ethylene (3 fluoride).

10. The threaded connection for pipes or tubes according to claim 1, wherein a hardness of the Cu—Sn—Zn alloy plating layer is a micro-Vickers hardness of 500 or more, and a thickness of the Cu—Sn—Zn alloy plating layer is in a range of 5 to 20 µm.

11. The threaded connection for pipes or tubes according to claim 10, wherein a hardness of the solid lubricant coating layer is a micro-Vickers hardness in a range of 15 to 25, and a thickness of the solid lubricant coating layer is in a range of 10 to 40 µm.

12. The threaded connection for pipes or tubes according to claim 11, wherein the fluororesin particles are one or more types selected from the group consisting of polytetrafluoroethylene, tetrafluoroethylene-perfluoroalkylvinyl ether copolymer, tetrafluoroethylene-hexafluoropropylene copolymer (4.6 fluoride), tetrafluoroethylene-ethylene copolymer, polyvinylidene difluoride (2 fluoride), and polychlorotrifluoro-ethylene (3 fluoride).

13. The threaded connection for pipes or tubes according to claim 10, wherein the fluororesin particles are one or more types selected from the group consisting of polytetrafluoroethylene, tetrafluoroethylene-perfluoroalkylvinyl ether copolymer, tetrafluoroethylene-hexafluoropropylene copolymer (4.6 fluoride), tetrafluoroethylene-ethylene copolymer, polyvinylidene difluoride (2 fluoride), and polychlorotrifluoro-ethylene (3 fluoride).

14. The threaded connection for pipes or tubes according to claim 1, wherein a hardness of the solid lubricant coating layer is a micro-Vickers hardness in a range of 15 to 25, and a thickness of the solid lubricant coating layer is in a range of 10 to 40 µm.

15. The threaded connection for pipes or tubes according to claim 4, wherein the fluororesin particles are one or more types selected from the group consisting of polytetrafluoroethylene, tetrafluoroethylene-perfluoroalkylvinyl ether copolymer, tetrafluoroethylene-hexafluoropropylene copolymer (4.6 fluoride), tetrafluoroethylene-ethylene copolymer, polyvinylidene difluoride (2 fluoride), and polychlorotrifluoro-ethylene (3 fluoride).

16. The threaded connection for pipes or tubes according to claim 1, wherein the fluororesin particles are one or more types selected from the group consisting of polytetrafluoroethylene, tetrafluoroethylene-perfluoroalkylvinyl ether copolymer, tetrafluoroethylene-hexafluoropropylene copolymer (4.6 fluoride), tetrafluoroethylene-ethylene copolymer, polyvinylidene difluoride (2 fluoride), and polychlorotrifluoro-ethylene (3 fluoride).

17. A method for producing a threaded connection for pipes or tubes, the threaded connection comprising a pin and a box, the pin and the box each comprising a contact surface having a threaded portion and an unthreaded metal contact portion, the method comprising the steps of:

forming surface roughness having an arithmetic mean roughness Ra in a range of 1 to 8 μm and a maximum height roughness Rz in a range of 10 to 40 μm by a blasting process on at least one of the contact surfaces of the pin and the box;

forming a Zn—Ni alloy plating layer consisting of a Zn—Ni alloy by electroplating after the surface roughness being formed;

forming a Cu—Sn—Zn alloy plating layer consisting of a Cu—Sn—Zn alloy by electroplating after the Zn—Ni alloy plating layer being formed; and forming a solid lubricant coating layer after the Cu—Sn—Zn alloy plating layer being formed.

* * * * *

UNITED STATES PATENT AND TRADEMARK OFFICE
CERTIFICATE OF CORRECTION

PATENT NO. : 11,391,400 B2
APPLICATION NO. : 16/613899
DATED : July 19, 2022
INVENTOR(S) : Kunio Goto It is certified that error appears in the above-identified patent and that said Letters Patent is hereby corrected as shown below:

In the Claims

In Column 34, Line 65 In Claim 15:
Please delete:
"claim 4"
And insert:
--claim 14--

Signed and Sealed this
Twenty-eighth Day of March, 2023

Katherine Kelly Vidal
*Director of the United States Patent and Trademark Office*